(12) United States Patent  
Tomita et al.

(10) Patent No.: US 11,799,164 B2  
(45) Date of Patent: Oct. 24, 2023

(54) FLEXIBLE PRINTED CIRCUIT BOARD AND BATTERY MODULE

(71) Applicant: NIPPON MEKTRON, LTD., Tokyo (JP)

(72) Inventors: Shunsuke Tomita, Tokyo (JP); Tomoki Kanayama, Tokyo (JP); Kazuyuki Azuma, Tokyo (JP)

(73) Assignee: NIPPON MEKTRON, LTD., Tokyo (JP)

( * ) Notice: Subject to any disclaimer, the term of this patent is extended or adjusted under 35 U.S.C. 154(b) by 163 days.

(21) Appl. No.: 17/152,445

(22) Filed: Jan. 19, 2021

(65) Prior Publication Data

US 2021/0249727 A1 Aug. 12, 2021

(30) Foreign Application Priority Data

Feb. 6, 2020 (JP) .................................. 2020-019139

(51) Int. Cl.
*H01M 50/284* (2021.01)
*H01M 50/507* (2021.01)
*H01M 50/519* (2021.01)

(52) U.S. Cl.
CPC ....... *H01M 50/284* (2021.01); *H01M 50/507* (2021.01); *H01M 50/519* (2021.01)

(58) Field of Classification Search
CPC ............. H01M 50/284; H01M 50/507; H01M 50/519; Y02E 60/10; Y02P 70/50; H05K 1/028; H05K 1/0296; H05K 1/0298

See application file for complete search history.

(56) References Cited

U.S. PATENT DOCUMENTS

| 4,980,034 A * | 12/1990 | Volfson ................ H01L 23/5383 257/E23.173 |
| 5,502,889 A * | 4/1996 | Casson ................... H05K 3/462 252/514 |
| 2010/0052692 A1 | 3/2010 | Yano et al. |
| 2014/0370343 A1 * | 12/2014 | Nomoto .............. H01M 50/249 29/842 |
| 2017/0223827 A1 | 8/2017 | Yamada et al. |
| 2017/0318663 A1 | 11/2017 | Kondo et al. |
| 2018/0248167 A1 | 8/2018 | Hashizawa et al. |
| 2019/0044197 A1 * | 2/2019 | Ota ...................... H01M 10/425 |
| 2020/0020912 A1 * | 1/2020 | Ota ........................ H01M 50/50 |
| 2020/0020919 A1 * | 1/2020 | Makino ................. H01M 50/50 |

FOREIGN PATENT DOCUMENTS

| JP | 2010056035 A | 3/2010 |
| JP | 2014086246 A | 5/2014 |
| JP | 2016085930 A | 5/2016 |
| JP | 2017199804 A | 11/2017 |
| JP | 2018142505 A | 9/2018 |

* cited by examiner

*Primary Examiner* — Michael L Dignan  
(74) *Attorney, Agent, or Firm* — Studebaker & Brackett PC

(57) ABSTRACT

A flexible printed circuit board which includes: a base film; and multiple wires formed on the base film, in which in a region attached to a battery including multiple arrayed cells, a conductor portion to be the multiple wires is provided only on one surface of the base film, at at least part of a region apart from the region attached to the battery, a conductor portion to be the multiple wires is provided on each surface of the base film, and the flexible printed circuit board further includes multiple conductive portions configured to electrically connect the wires on one surface side of the base film and the wires on the other surface side of the base film.

18 Claims, 12 Drawing Sheets

FLEXIBLE PRINTED CIRCUIT BOARD AND BATTERY MODULE

CROSS-REFERENCE TO RELATED APPLICATION

This application claims priority from Japanese Patent Application No. 2020-019139 filed with the Japan Patent Office on Feb. 6, 2020, the entire content of which is hereby incorporated by reference.

BACKGROUND

1. Technical Field

One aspect of the present disclosure relates to a flexible printed circuit board and a battery module.

2. Related Art

For example, a voltage monitoring apparatus configured to monitor the voltage of a battery mounted on, e.g., an electric vehicle is provided at the battery. A battery module having a flexible printed circuit board (hereinafter referred to as an "FPC") is provided at the voltage monitoring apparatus. A voltage monitoring apparatus according to a typical example will be described with reference to FIGS. 8 to 10. FIG. 8 is a plan view of a battery. FIG. 9 is a side view of the battery. FIG. 10 is a plan view illustrating a state in which a battery module according to the typical example is attached to the battery.

A battery 1200 includes multiple cells 1210. These multiple cells 1210 are arrayed such that a positive electrode 1211 and a negative electrode 1212 are adjacent to each other in adjacent ones of the cells 1210. Moreover, these multiple cells 1210 are connected in series in such a manner that adjacent ones of the positive electrodes 1211 and the negative electrodes 1212 are electrically connected to each other through a bus bar 1114. Note that in the illustrated example, the battery 1200 including six cells 1210 is illustrated for the sake of convenience in illustration. However, a battery mounted on, e.g., an electric vehicle generally includes more cells.

A battery module 1500 is attached to an upper portion of the battery 1200 as configured above. The battery module 1500 includes an FPC 1510, a support member 1520 configured to support the FPC 1510, the multiple bus bars 1113, 1114 supported on the support member 1520, and a connector 1530 connected to a not-shown voltage monitoring apparatus body. The bus bars 1113 are each connected to the positive electrode 1211 and the negative electrode 1212 at both end cells 1210 of the cells 1210 connected in series. Moreover, the bus bar 1114 is used for electrically connecting adjacent ones of the positive electrodes 1211 and the negative electrodes 1212.

Multiple wires 1511 are provided on the FPC 1510. Each of one end portions A11, A12, A13, A14, A15, A16, A17 of these multiple wires 1511 is attached to a corresponding one of the bus bars 1113, 1114. The other end portions B11, B12, B13, B14, B15, B16, B17 of these multiple wires 1511 are attached to the connector 1530. The potentials of one end portion A1$n$ and the other end portion B1$n$ are V1$n$, such as the potentials V11 of one end portion A11 and the other end portion B11 and the potential V12 of one end portion A12 and the other end portion B12. In this case, V11>V12>V13>V14>V15>V16>V17 is satisfied. This is because the multiple cells 1210 are connected in series as described above.

In such a configuration, arrangement of the multiple wires 1511 at a portion corresponding to the connector 1530 is, in FIG. 10, the other end portions B11, B13, B15, B17, B16, B14, B12 in this order from the top. Generally, short circuit due to, e.g., migration is more likely to occur as potential difference between adjacent wires of the FPC and between adjacent terminals of the connector connected to the FPC increase. Thus, it has been demanded that the potential differences between adjacent wires and between adjacent terminals are decreased as much as possible. That is, arrangement of the multiple wires 1511 at the portion corresponding to the connector 1530 is preferably the other end portions B11, B12, B13, B14, B15, B16, B17 in this order from the top.

However, it is difficult to change arrangement of adjacent wires only by designing of a print pattern on the multiple wires (conductor layer portions) printed on the base film in the FPC. The order of wire arrangement can be changed in such a manner that wires are formed to three-dimensionally cross each other by a jumper as in a well-known method. However, in the case of employing the structure using the jumper, a cost increases. For this reason, a structure using no jumper is preferred.

Note that prior art literatures of the present application include, for example, JP-A-2010-56035, JP-A-2014-86246, JP-A-2016-85930, JP-A-2017-199804, and JP-A-2018-142505.

SUMMARY

A flexible printed circuit board which includes: a base film; and multiple wires formed on the base film, in which in a region attached to a battery including multiple arrayed cells, a conductor portion to be the multiple wires is provided only on one surface of the base film, at at least part of a region apart from the region attached to the battery, a conductor portion to be the multiple wires is provided on each surface of the base film, and the flexible printed circuit board further includes multiple conductive portions configured to electrically connect the wires on one surface side of the base film and the wires on the other surface side of the base film.

DETAILED DESCRIPTION

Figure 1:
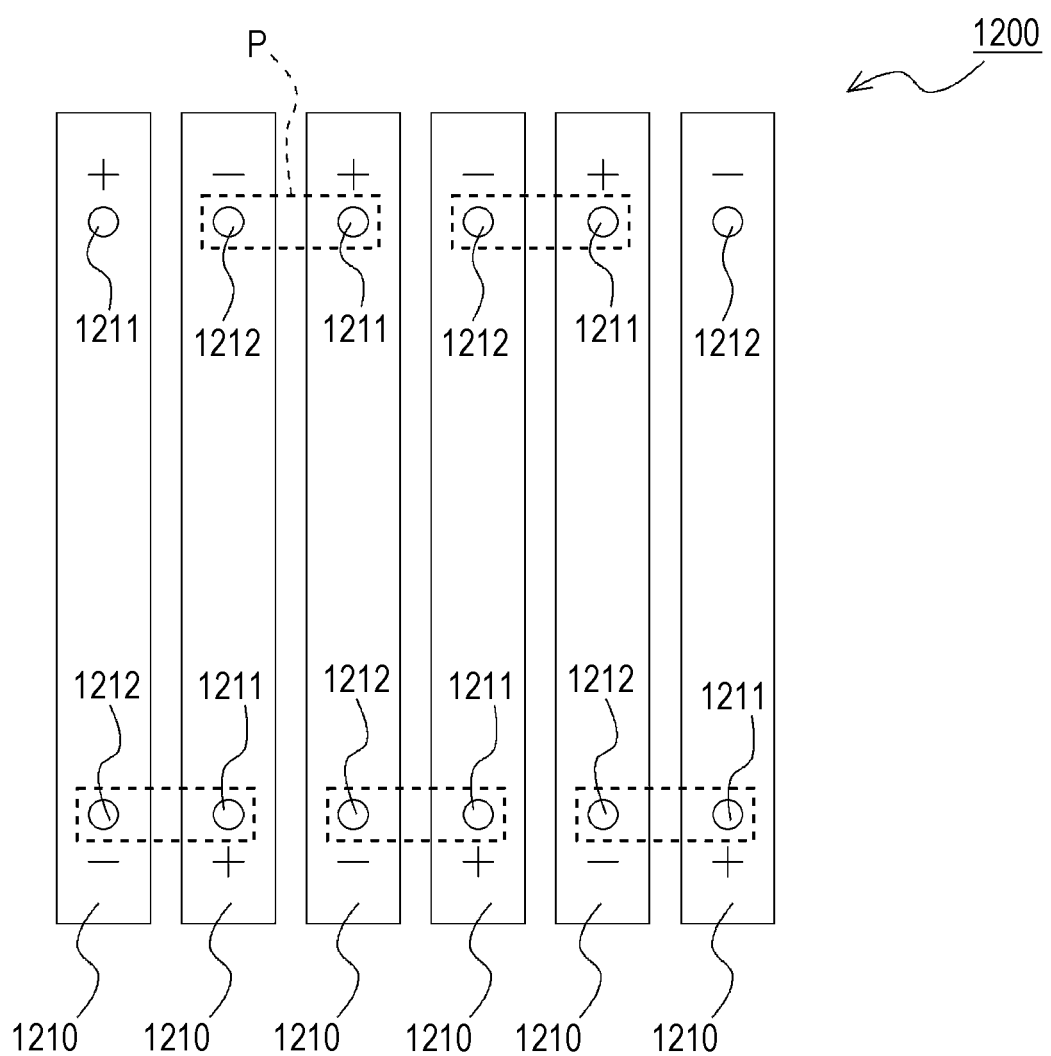
FIG. 1 is a plan view of a battery.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

One object of the present disclosure is to provide a flexible printed circuit board and a battery module configured so that workability in attachment to a battery can be enhanced while the degree of freedom in changing wire arrangement can be enhanced.

In aspects of the present disclosure, the following configurations are employed.

That is, a flexible printed circuit board according to an aspect of the present disclosure includes: a base film; and multiple wires formed on the base film. In the flexible printed circuit board, in a region attached to a battery including multiple arrayed cells, a conductor portion to be the multiple wires is provided only on one surface of the base film, at at least part of a region apart from the region attached to the battery, a conductor portion to be the multiple wires is provided on each surface of the base film, and the flexible printed circuit board further includes multiple conductive portions configured to electrically connect the wires on one surface side of the base film and the wires on the other surface side of the base film.

Further, a battery module according to an aspect of the present disclosure includes: a flexible printed circuit board attached to a battery including multiple arrayed cells; multiple bus bars each electrically connected to multiple wires provided on the flexible printed circuit board and each electrically connected to electrodes provided on the multiple cells; and a connector fixed at an end portion of the flexible printed circuit board. The flexible printed circuit board includes a base film, and the multiple wires formed on the base film, and in a region of the flexible printed circuit board attached to the battery, a conductor portion to be the multiple wires is provided only on one surface of the base film, at at least part of a region apart from the region of the flexible printed circuit board attached to the battery, a conductor portion to be the multiple wires is provided on each surface of the base film, and multiple conductive portions configured to electrically connect the wires on one surface side of the base film and the wires on the other surface side of the base film are arranged on the flexible printed circuit board.

According to these aspects of the present disclosure, on the flexible printed circuit board, the configuration in which the conductor portion to be the multiple wires is provided only on one surface of the base film in the region attached to the battery is employed. Thus, the region of the flexible printed circuit board attached to the battery has high flexibility. Consequently, the flexible printed circuit board has excellent attachment workability. Moreover, the following configuration is employed on the flexible printed circuit board. In this configuration, the conductor portions to be the multiple wires are provided on both surfaces of the base film at at least part of the region apart from the region attached to the battery, and the multiple conductive portions electrically connecting the wires on one surface side of the base film and the wires on the other surface side of the base film are arranged. With this configuration, wire arrangement can be changed.

The conductive portions may be formed as through-holes. Moreover, on the flexible printed circuit board, a reinforcing plate is preferably attached to a region in which the multiple through-holes are arranged.

With this configuration, bending of the flexible printed circuit board at a portion corresponding to the through-holes is reduced. Thus, degradation of a conductive function is reduced.

On the base film, multiple branch portions for arranging the wires from a trunk portion on which the multiple wires are arranged toward each cell may be provided. Moreover, a reinforcing film is preferably provided on each of the multiple branch portions.

With this configuration, the strength of a portion, of which strength is easily degraded, corresponding to the branch portion can be enhanced.

A bending portion allowing expansion and contraction in a longitudinal direction of the flexible printed circuit board is preferably provided at the flexible printed circuit board.

With this configuration, workability in attachment of the flexible printed circuit board can be further enhanced.

The multiple conductive portions electrically connecting the wires on one surface side of the base film and the wires on the other surface side of the base film are preferably provided such that the wires are, in one-to-one correspondence, electrically connected to each other at multiple locations.

With this configuration, even in a case where the conductive function of some conductive portions is degraded due to some kinds of influence, the other conductive portions provide the conductive function. Thus, lost of energization can be reduced.

Note that the above-described configurations can be employed in combination to an extent possible.

As described above, according to the aspects of the present disclosure, the workability in attachment to the battery can be enhanced while the degree of freedom in changing the wire arrangement can be enhanced.

Hereinafter, exemplary modes for carrying out the technique of the present disclosure will be described in detail with reference to the drawings.

First, the method for changing wire arrangement without using a jumper will be described in the following embodiments.

First Embodiment

Figure 11:
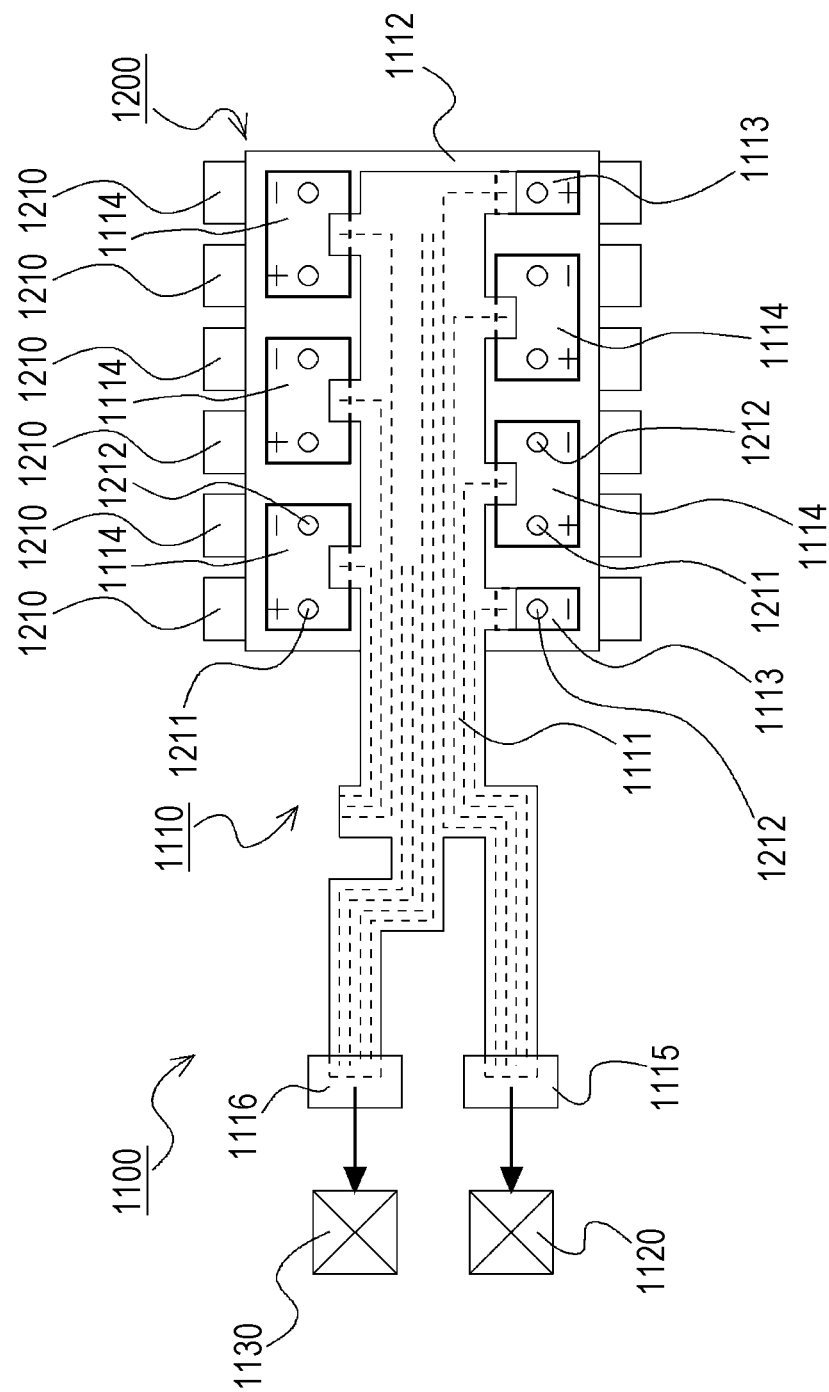
FIG. 11 is a plan view schematically illustrating a state in which a battery module according to a first embodiment is attached to a battery.
Figure 12:
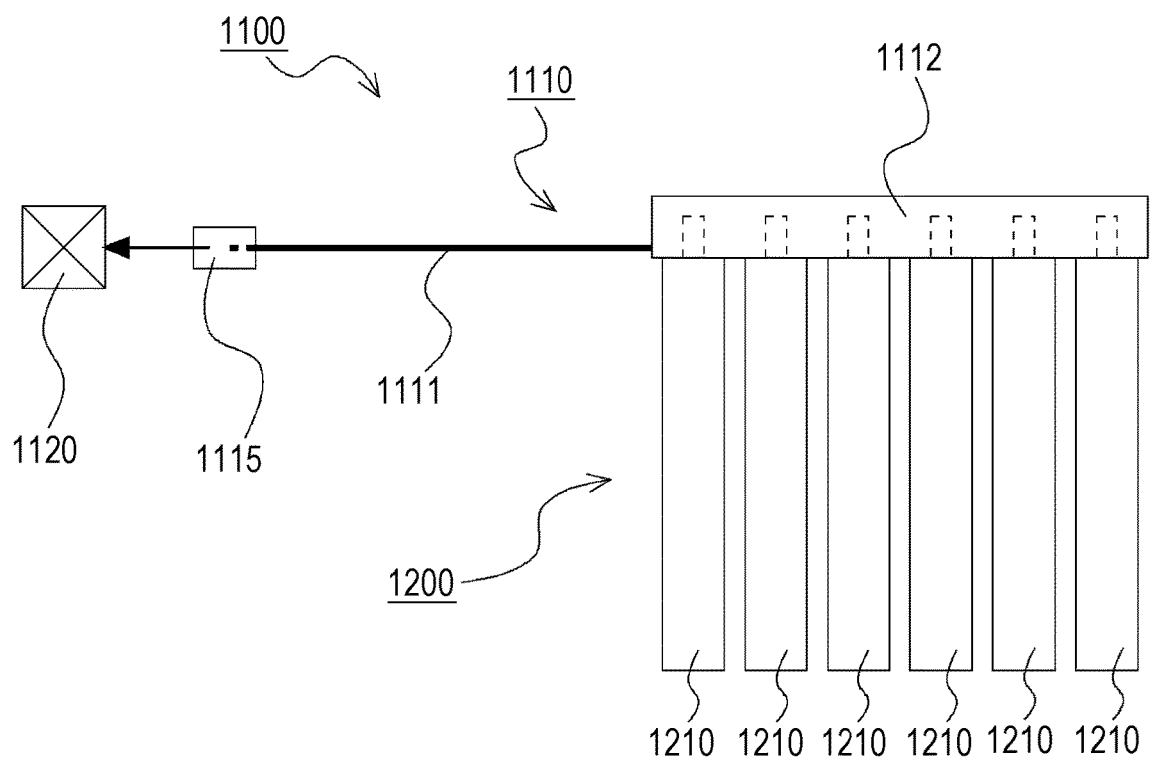
FIG. 12 is a side view schematically illustrating the state in which the battery module according to the first embodiment is attached to the battery.
Figure 13:
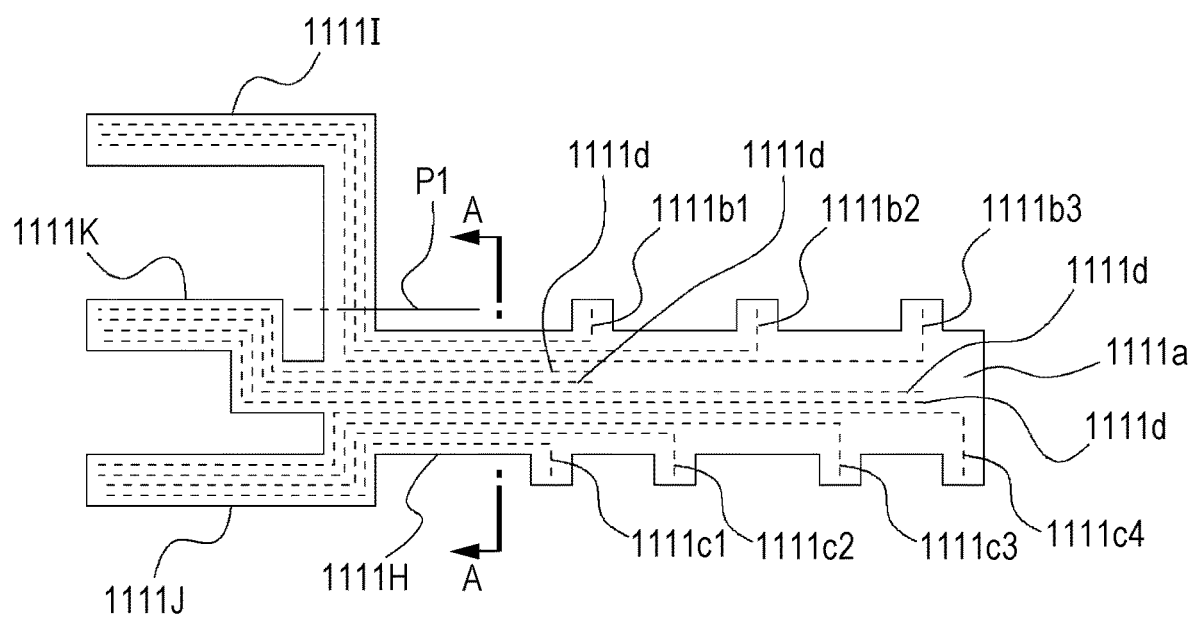
FIG. 13 is a plan view of an FPC according to the first embodiment.
Figure 14:
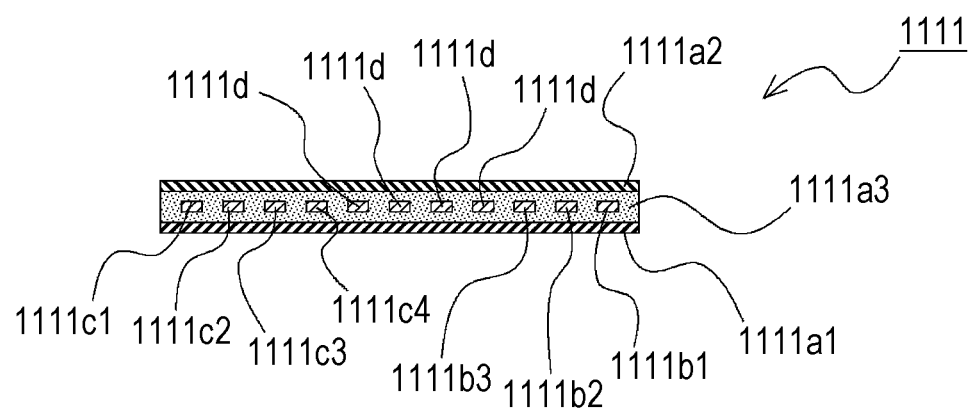
FIG. 14 is a schematic sectional view of the FPC according to the first embodiment.
Figure 15:
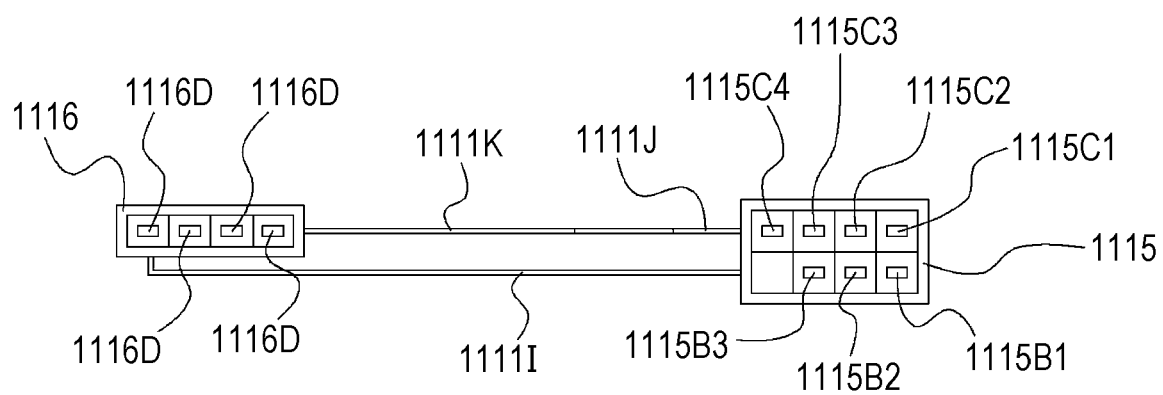
FIG. 15 is a front view of the battery module according to the first embodiment.

An FPC and a battery module according to a first embodiment will be described with reference to FIGS. 11 to 15. FIG. 11 is a plan view (a view from above) schematically illustrating a state in which a battery module according to the first embodiment is attached to a battery. FIG. 12 is a side view schematically illustrating the state in which the battery module according to the first embodiment is attached to the battery. FIG. 13 is a plan view of the FPC according to the first embodiment. Note that in FIGS. 11 and 13, wires are indicated by dashed lines in a see-through state for the sake of simplicity in illustration of a configuration of the FPC. FIG. 14 is a schematic sectional view of the FPC according to the first embodiment, FIG. 14 being the sectional view along an AA line in FIG. 13. FIG. 15 is a front view of the battery module according to the first embodiment, FIG. 15 being a schematic configuration view when the battery module is viewed from a connector side (the left side in FIGS. 11 and 12). Note that a configuration of the battery is a configuration similar to that of a well-known technique, and therefore, description thereof will be omitted.

<Voltage Monitoring Apparatus and Battery Module>

Specifically, entire configurations of a voltage monitoring apparatus 1100 and a battery module 1110 according to the first embodiment will be described with reference to FIGS. 11 and 12. The voltage monitoring apparatus 1100 includes the battery module 1110, a voltage monitoring apparatus body 1120, and a temperature measurement apparatus body 1130. The battery module 1110 includes an FPC 1111, a support member 1112 configured to support the FPC 1111, multiple bus bars 1113, 1114 supported on the support member 1112, a first connector 1115 connected to the voltage monitoring apparatus body 1120, and a second connector 1116 connected to the temperature measurement apparatus body 1130. The bus bars 1113 are each connected to a positive electrode 1211 and a negative electrode 1212 at both end cells 1210 of cells 1210 connected in series. Moreover, the bus bar 1114 is used for electrically connecting the positive electrode 1211 and the negative electrode 1212 adjacent to each other.

<Flexible Printed Circuit Board (FPC)>

Specifically, the FPC 1111 according to the first embodiment will be described with reference to FIG. 11 and FIGS. 13 to 15. The FPC 1111 includes a film 1111a having flexibility and multiple wires (voltage monitoring wires 1111b1, 1111b2, 1111b3, 1111c1, 1111c2, 1111c3, 1111c4 and temperature measurement wires 1111d). The film 1111a includes a base film 1111a1, a cover film 1111a2, and an adhesive layer 1111a3 bonding these films. Moreover, the above-described multiple wires are formed from, e.g., copper foil. On the FPC 1111 according to the first embodiment, all wires are provided on one surface side of the base film 1111a1.

Moreover, the FPC 1111 according to the first embodiment includes a trunk portion 1111H partially supported on the support member 1112 and a first branch portion 1111I, a second branch portion 1111J, and a third branch portion 1111K branched from the trunk portion 1111H.

In the first embodiment, the FPC 1111 includes the multiple voltage monitoring wires 1111b1, 1111b2, 1111b3, 1111c1, 1111c2, 1111c3, 1111c4 for monitoring the voltage of a battery 1200 and the multiple temperature measurement wires 1111d for measuring the temperatures of the cells 1210. Note that in the illustrated example, four temperature measurement wires 1111d are provided for measuring temperatures at two locations. The trunk portion 1111H includes all wires. Moreover, the first branch portion 1111I includes the voltage monitoring wires 1111b1, 1111b2, 1111b3. The second branch portion 1111.1 includes the voltage monitoring wires 1111c1, 1111c2, 1111c3, 1111c4. The third branch portion 1111K includes the temperature measurement wires 1111d.

The FPC 1111 is arranged such that the multiple voltage monitoring wires 1111b1, 1111b2, 1111b3, 1111c1, 1111c2, 1111c3, 1111c4 and the temperature measurement wires 1111d cross between the positive electrode 1211 and the negative electrode 1212 of each cell 1210. Moreover, each of tip ends of the multiple voltage monitoring wires 1111b1, 1111b2, 1111b3, 1111c1, 1111c2, 1111c3, 1111c4 is connected to the first connector 1115. Each of tip ends of the multiple temperature measurement wires 1111d is connected to the second connector 1116.

On the FPC 1111, a first arrangement region in which the multiple voltage monitoring wires 1111b1, 1111b2, 1111b3 are arranged and a second arrangement region in which the multiple voltage monitoring wires 1111c1, 1111c2, 1111c3, 1111c4 are arranged are each provided on one and the other sides with respect to an arrangement region of the multiple temperature measurement wires 1111d. On the trunk portion 1111H, the first arrangement region is provided on the upper side in FIG. 13 and the right side in FIG. 14 with respect to the arrangement region of the multiple temperature measurement wires 1111d. Moreover, the second arrangement region is provided on the lower side in FIG. 13 and the left side in FIG. 14 with respect to the arrangement region of the multiple temperature measurement wires 1111d.

On the trunk portion 1111H, one of the multiple voltage monitoring wires 1111b1, 1111b2, 1111b3, which are arranged in the first arrangement region, closer to the arrangement region of the temperature measurement wires 1111d is connected to one of the cells 1210 arranged at a position farther from the first connector 1115. Similarly, on the trunk portion 1111H, one of the multiple voltage monitoring wires 1111c1, 1111c2, 1111c3, 1111c4, which are arranged in the second arrangement region, closer to the arrangement region of the temperature measurement wires 1111d is connected to one of the cells 1210 arranged at a position farther from the first connector 1115. As seen from FIGS. 11 and 13, the potentials of the voltage monitoring wires satisfy a relationship of Vc4>Vb3>Vc3>Vb2>Vc2>Vb1>Vc1. Note that the potentials of the voltage monitoring wires 1111b1, 1111b2, 1111b3 are each Vb1, Vb2, and Vb3. Further, the potentials of the voltage monitoring wires 1111c1, 1111c2, 1111c3, 1111c4 are each Vc1, Vc2, Vc3, and Vc4.

On the FPC 1111 according to the first embodiment, a tip end of the first branch portion 1111I and a tip end of the second branch portion 1110 are connected to the first connector 1115 in a state in which a tip end side of the first branch portion 1111I is bent to a far side in the plane of paper with respect to a bending line which is a portion indicated by a chain line P1 in FIG. 13. Note that a tip end of the third branch portion 1111K is connected to the second connector 1116.

As described above, at a location connected to the first connector 1115, the FPC 1111 is used in a state in which part of the FPC 1111 is bent as follows. That is, part of the FPC 1111 is bent such that front and back surfaces of the FPC 1111 face each other and the multiple voltage monitoring wires 1111b1, 1111b2, 1111b3 provided in the first arrangement region and the multiple voltage monitoring wires 1111c1, 1111c2, 1111c3, 1111c4 provided in the second arrangement region are in parallel with each other.

Terminals 1115B1, 1115B2, 1115B3 of the first connector 1115 as illustrated in FIG. 15 are each electrically connected to the voltage monitoring wires 1111b1, 1111b2, 1111b3. Moreover, terminals 1115C1, 1115C2, 1115C3, 1115C4 of the first connector 1115 are each electrically connected to the voltage monitoring wires 1111c1, 1111c2, 1111c3, 1111c4. Further, multiple terminals 1116D of the second connector 1116 are each electrically connected to the temperature measurement wires 1111d.

As described above, the relationship of Vc4>Vb3>Vc3>Vb2>Vc2>Vb1>Vc1 is satisfied. Thus, a relationship of VC4>VB3>VC3>VB2>VC2>VB1>VC1 is satisfied. Note that the potentials of the terminals 1115B1, 1115B2, 1115B3 are each VB1, VB2, and VB3. Further, the potentials of the terminals 1115C1, 1115C2, 1115C3, 1115C4 are each VC1, VC2, VC3, and VC4.

<Merits of Flexible Printed Circuit Board and Battery Module according to First Embodiment>

According to the FPC 1111 of the first embodiment, the potentials of the voltage monitoring wires satisfy, as described above, the relationship of Vc4>Vb3>Vc3>Vb2>Vc2>Vb1>Vc1. That is, a potential difference between adjacent ones of the multiple voltage monitoring wires 1111b1, 1111b2, 1111b3 arranged in the first arrangement region is a potential difference between adjacent cells. Moreover, a potential difference between adjacent ones of the multiple voltage monitoring wires 1111c1, 1111c2, 1111c3, 1111c4 arranged in the second arrangement region is a potential difference between adjacent cells. That is, the potential difference between adjacent ones of the voltage monitoring wires is the minimum potential difference among potential differences between two of the multiple cells 1210 forming the battery 1200.

Moreover, according to the FPC 1111 of the first embodiment, the relationship of VC4>VB3>VC3>VB2>VC2>VB1>VC1 is satisfied as described above. Thus, a potential difference between adjacent ones of the first-arrangement-region-side voltage monitoring wires 1111b1, 1111b2, 1111b3 and the second-arrangement-region-side voltage monitoring wires 1111c1, 1111c2, 1111c3, 1111c4 can be minimized. Further, a potential difference between adjacent terminals of the first connector 1115 can be minimized.

With the above-described configuration, occurrence of migration can be reduced on the FPC 1111 integrally having the voltage monitoring wires 1111b1, 1111b2, 1111b3, 1111c1, 1111c2, 1111c3, 1111c4 and the temperature measurement wires 1111d.

Moreover, on the FPC 1111 according to the first embodiment, all wires (the voltage monitoring wires 1111b1, 1111b2, 1111b3, 1111c1, 1111c2, 1111c3, 1111c4 and the temperature measurement wires 1111d) are provided on one surface of the base film 1111a1.

Further, in the battery module 1110 according to the first embodiment, the first connector 1115 connected to each of the tip ends of the multiple voltage monitoring wires 1111b1, 1111b2, 1111b3, 1111c1, 1111c2, 1111c3, 1111c4 and the second connector 1116 connected to each of the tip ends of the multiple temperature measurement wires 1111d are separately provided. With this configuration, influence of the potentials of the voltage monitoring wires 1111b1, 1111b2, 1111b3, 1111c1, 1111c2, 1111c3, 1111c4 on the temperature measurement wires 1111d having lower potentials than those of the voltage monitoring wires 1111b1, 1111b2, 1111b3, 1111c1, 1111c2, 1111c3, 1111c4 is reduced. Thus, temperature measurement accuracy can be enhanced.

Second Embodiment

Figure 16:
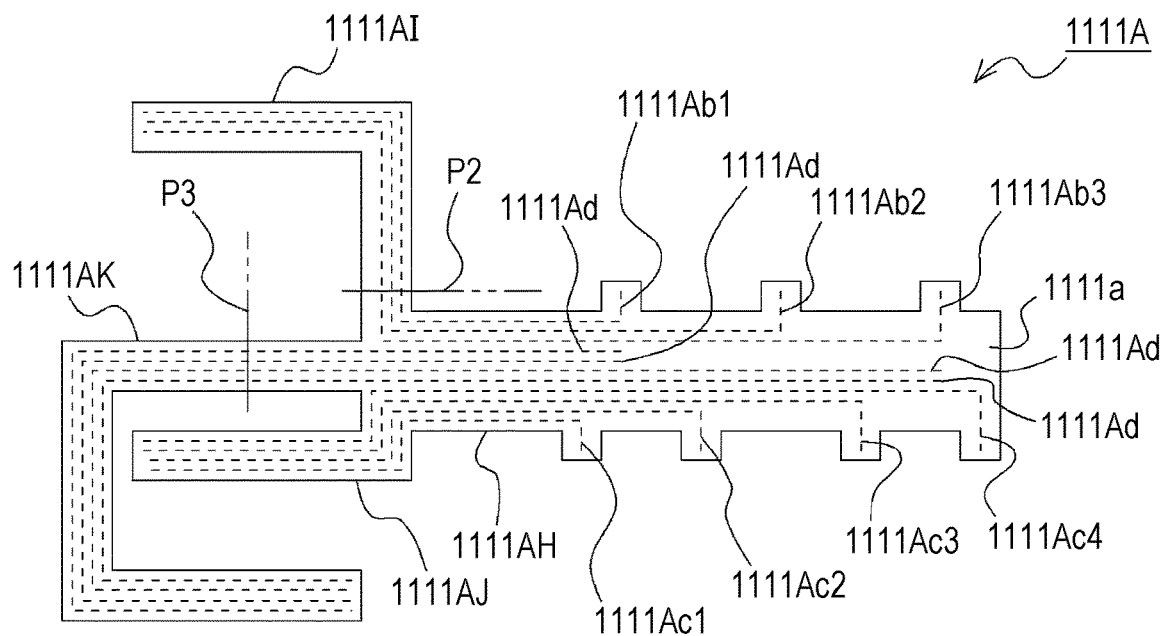
FIG. 16 is a plan view of an FPC according to a second embodiment.
Figure 17:
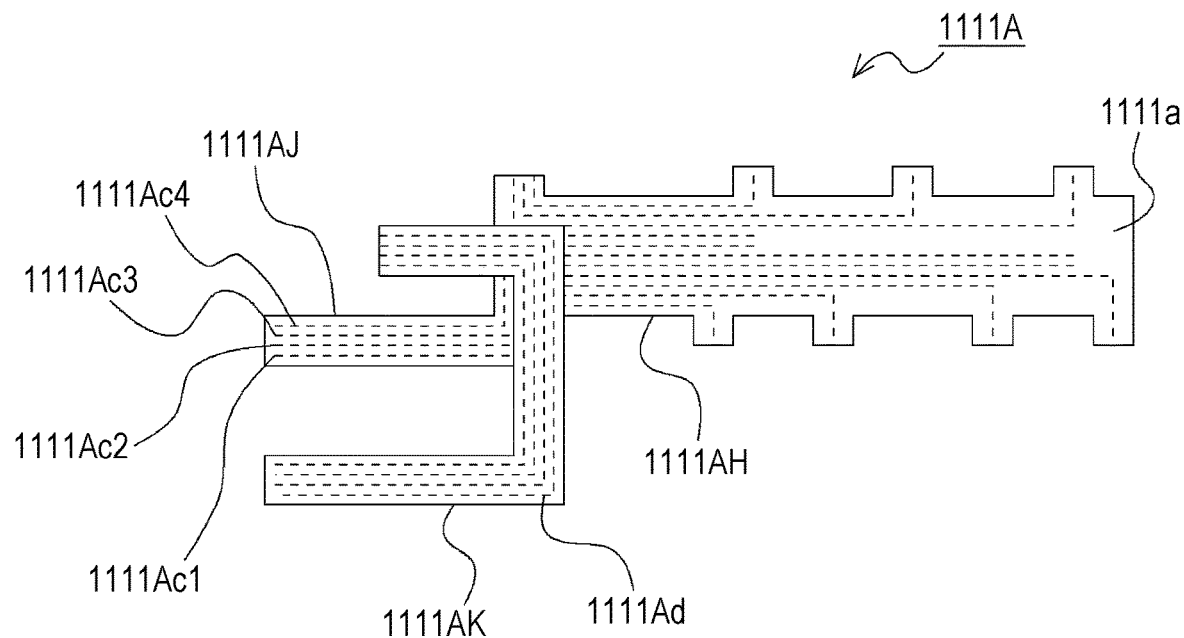
FIG. 17 is a plan view of the FPC according to the second embodiment.

FIGS. 16 and 17 illustrate a second embodiment. A configuration described in the second embodiment is different from that in the case of the first embodiment in a configuration of an FPC. The configurations described in the first embodiment are applicable as configurations other than the FPC, and therefore, description thereof will be omitted.

FIGS. 16 and 17 are plan views of the FPC according to the second embodiment. Note that FIG. 16 illustrates the FPC in a state before bending. FIG. 17 illustrates the FPC in a state (a state upon use) after bending. Note that in FIGS. 16 and 17, wires are indicated by dashed lines in a see-through state for the sake of simplicity in illustration of the configuration of the flexible printed circuit board. As in the case of the first embodiment, an FPC 1111A according to the second embodiment includes a film 1111a having flexibility and multiple wires (voltage monitoring wires 1111Ab1, 1111Ab2, 1111Ab3, 1111Ac1, 1111Ac2, 1111Ac3, 1111Ac4 and temperature measurement wires 1111Ad). Although not specifically shown in the figure, the film 1111a according to the second embodiment also includes, as in the case of the first embodiment, a base film, a cover film, and an adhesive layer bonding these films. Moreover, the above-described multiple wires are formed from, e.g., copper foil. On the FPC 1111A according to the second embodiment, all wires are also provided on one surface side of the base film as in the case of the first embodiment.

Moreover, the FPC 1111A according to the second embodiment includes a trunk portion 1111AH partially supported on a support member 1112 and a first branch portion 1111AI, a second branch portion 1111AJ, and a third branch portion 1111AK branched from the trunk portion 1111AH. Note that the configurations described in the first embodiment are applicable as configurations other than the FPC 1111A in a battery module and a voltage monitoring apparatus. Thus, configurations not shown in FIGS. 16 and 17 will be hereinafter also described using the reference numerals described in the first embodiment.

In the second embodiment, the FPC 1111A includes the multiple voltage monitoring wires 1111Ab1, 1111Ab2, 1111Ab3, 1111Ac1, 1111Ac2, 1111Ac3, 1111Ac4 for monitoring the voltage of a battery 1200 and the multiple temperature measurement wires 1111Ad for measuring the temperatures of cells 1210. Note that in the illustrated example, four temperature measurement wires 1111Ad are provided for measuring temperatures at two locations. The trunk portion 1111AH includes all wires. Moreover, the first branch portion 1111AI includes the voltage monitoring wires 1111Ab1, 1111Ab2, 1111Ab3. The second branch portion 1111AJ includes the voltage monitoring wires 1111Ac1, 1111Ac2, 1111Ac3, 1111Ac4. The third branch portion 1111AK includes the temperature measurement wires 1111Ad.

The FPC 1111A is arranged such that the multiple voltage monitoring wires 1111Ab1, 1111Ab2, 1111Ab3, 1111Ac1, 1111Ac2, 1111Ac3, 1111Ac4 and the temperature measurement wires 1111Ad cross between a positive electrode 1211 and a negative electrode 1212 of each cell 1210. Moreover, each of tip ends of the multiple voltage monitoring wires 1111Ab1, 1111Ab2, 1111Ab3, 1111Ac1, 1111Ac2, 1111Ac3, 1111Ac4 is connected to a first connector 1115. Each of tip ends of the multiple temperature measurement wires 1111Ad is connected to a second connector 1116.

On the FPC 1111A, a first arrangement region in which the multiple voltage monitoring wires 1111Ab1, 1111Ab2, 1111Ab3 are arranged and a second arrangement region in which the multiple voltage monitoring wires 1111Ac1, 1111Ac2, 1111Ac3, 1111Ac4 are arranged are each provided on one and the other sides with respect to an arrangement region of the multiple temperature measurement wires 1111Ad. On the trunk portion 1111AH, the first arrangement region is provided on the upper side in FIG. 16 with respect to the arrangement region of the multiple temperature measurement wires 1111Ad. Moreover, on the trunk portion 1111AH, the second arrangement region is provided on the lower side in FIG. 16 with respect to the arrangement region of the multiple temperature measurement wires 1111Ad.

On the trunk portion 1111AH, one of the multiple voltage monitoring wires 1111Ab1, 1111Ab2, 1111Ab3, which are arranged in the first arrangement region, closer to the arrangement region of the temperature measurement wires 1111Ad is connected to one of the cells 1210 arranged at a position farther from the first connector 1115. Similarly, on the trunk portion 1111AH, one of the multiple voltage monitoring wires 1111Ac1, 1111Ac2, 1111Ac3, 1111Ac4, which are arranged in the second arrangement region, closer to the arrangement region of the temperature measurement wires 1111Ad is connected to one of the cells 1210 arranged at a position farther from the first connector 1115. Thus, as in the case of the first embodiment, the potentials of the voltage monitoring wires satisfy a relationship of VAc4>VAb3>VAc3>VAb2>VAc2>VAb1>VAc1. Note that the potentials of the voltage monitoring wires 1111Ab1, 1111Ab2, 1111Ab3 are each VAb1, VAb2, and VAb3. Further, the potentials of the voltage monitoring wires 1111Ac1, 1111Ac2, 1111Ac3, 1111Ac4 are each VAc1, VAc2, VAc3, and VAc4.

On the FPC 1111A according to the second embodiment, a tip end of the first branch portion 1111AI and a tip end of the second branch portion 1111AJ are connected to the first connector 1115 in a state in which a tip end side of the first branch portion 1111AI is bent to a far side in the plane of paper with respect to a bending line which is a portion indicated by a chain double-dashed line P2 in FIG. 16. Moreover, a tip end of the third branch portion 1111AK is connected to the second connector 1116 in a state in which a tip end side of the third branch portion 1111AK is bent to a near side in the plane of paper with respect to a bending line which is a portion indicated by a chain double-dashed line P3 in FIG. 16.

As described above, in the second embodiment, at a location connected to the first connector 1115, the FPC 1111A is also used in a state in which part of the FPC 1111A is bent as follows. That is, part of the FPC 1111A is bent such that front and back surfaces of the FPC 1111A face each other and the multiple voltage monitoring wires 1111Ab1, 1111Ab2, 1111Ab3 provided in the first arrangement region and the multiple voltage monitoring wires 1111Ac1, 1111Ac2, 1111Ac3, 1111Ac4 provided in the second arrangement region are in parallel with each other.

Note that in the case of the second embodiment, terminals 1115B1, 1115B2, 1115B3 of the first connector 1115 are each electrically connected to the voltage monitoring wires 1111Ab1, 1111Ab2, 1111Ab3. Moreover, terminals 1115C1, 1115C2, 1115C3, 1115C4 of the first connector 1115 are each electrically connected to the voltage monitoring wires 1111Ac1, 1111Ac2, 1111Ac3, 1111Ac4.

As described above, the relationship of VAc4>VAb3>VAc3>VAb2>VAc2>VAb1>VAc1 is satisfied. Thus, as in the case of the first embodiment, the potentials of the terminals of the first connector 1115 satisfies a relationship of VC4>VB3>VC3>VB2>VC2>VB1>VC1.

On the FPC 1111A according to the second embodiment as configured above, advantageous effects similar to those in the case of the first embodiment can be also provided.

Third Embodiment

Figure 18:
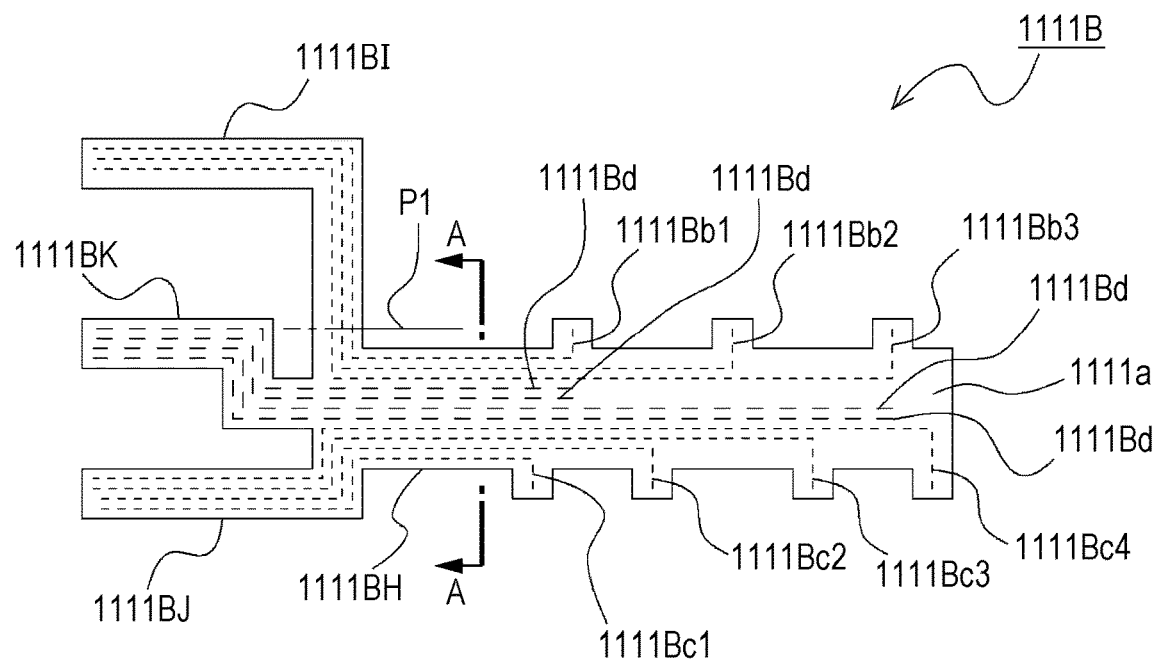
FIG. 18 is a plan view of a flexible printed circuit board according to a third embodiment.
Figure 19:
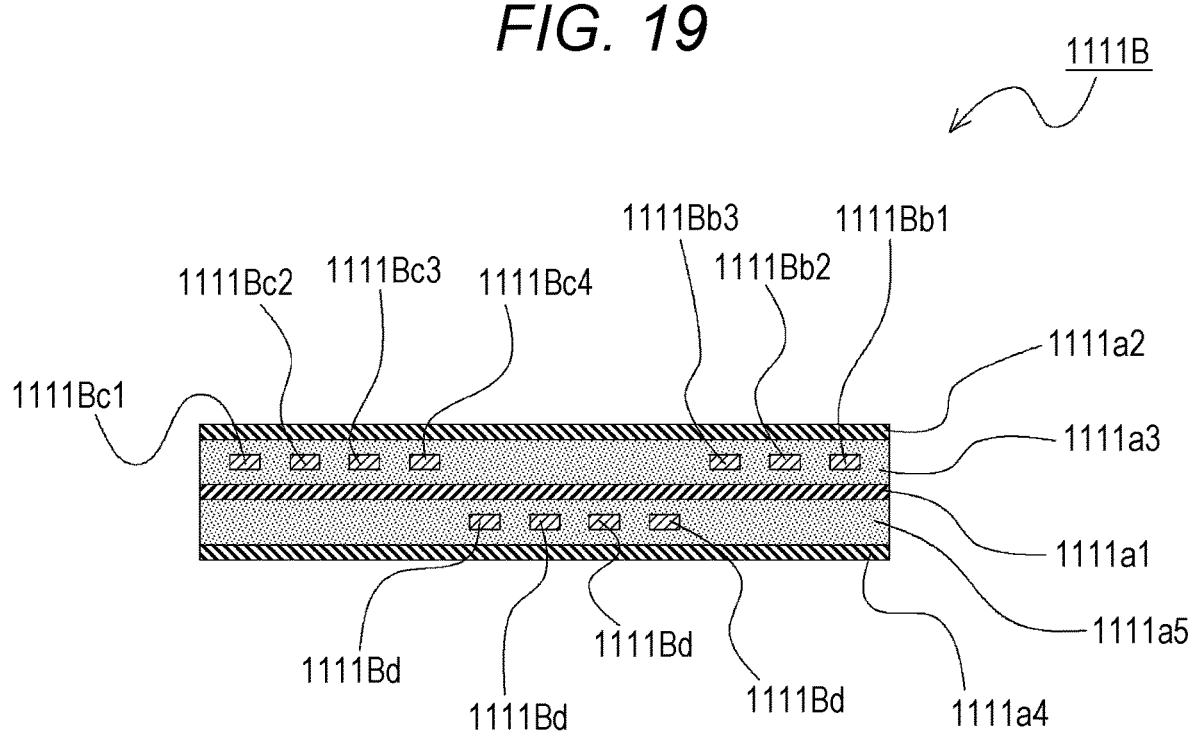
FIG. 19 is a schematic sectional view of the flexible printed circuit board according to the third embodiment.

FIGS. 18 and 19 illustrate a third embodiment. A configuration described in the third embodiment is different from that in the case of the first embodiment in a configuration of an FPC. The configurations described in the first embodiment are applicable as configurations other than the FPC, and therefore, description thereof will be omitted.

FIG. 18 is a plan view of the flexible printed circuit board according to the third embodiment. Note that in FIG. 18, wires are indicated by dashed lines in a see-through state for the sake of simplicity in illustration of the configuration of the flexible printed circuit board. FIG. 19 is a schematic sectional view of the flexible printed circuit board according to the third embodiment, FIG. 19 being a sectional view along an AA line in FIG. 18.

As in the case of the first embodiment, an FPC 1111B according to the third embodiment includes a film 1111a having flexibility and multiple wires (voltage monitoring wires 1111Bb1, 1111Bb2, 1111Bb3, 1111Bc1, 1111Bc2, 1111Bc3, 1111Bc4 and temperature measurement wires 1111Bd). The film 1111a according to the third embodiment includes a base film 1111a1, a pair of cover films 1111a2, 1111a4, an adhesive layer 1111a3 bonding the base film 1111a1 and the front cover film 1111a2, and an adhesive layer 1111a5 bonding the base film 1111a1 and the back cover film 1111a4. Moreover, the above-described multiple wires are formed from, e.g., copper foil. The FPC 1111B according to the third embodiment is different from that in the case of the first embodiment in the following point. That is, on the FPC 1111B, the voltage monitoring wires 1111Bb1, 1111Bb2, 1111Bb3, 1111Bc1, 1111Bc2, 1111Bc3, 1111Bc4 are provided on one surface side (a front side) of the base film 1111a1, and the temperature measurement wires 1111Bd are provided on the other surface side (a back side) of the base film 1111a1.

Moreover, the FPC 1111B according to the third embodiment includes a trunk portion 1111BH partially supported on a support member 1112 and a first branch portion 1111BI, a second branch portion 1111BJ, and a third branch portion 1111BK branched from the trunk portion 1111BH. Note that the configurations described in the first embodiment are applicable as configurations other than the FPC 1111B in a battery module and a voltage monitoring apparatus. Thus, configurations not shown in FIGS. 18 and 19 will be hereinafter also described using the reference numerals described in the first embodiment.

In the third embodiment, the FPC 1111B includes the multiple voltage monitoring wires 1111Bb1, 1111Bb2, 1111Bb3, 1111Bc1, 1111Bc2, 1111Bc3, 1111Bc4 for monitoring the voltage of a battery 1200 and the multiple temperature measurement wires 1111Bd for measuring the temperatures of cells 1210. Note that in the illustrated example, four temperature measurement wires 1111Bd are provided for measuring temperatures at two locations. The trunk portion 1111BH includes all wires. Moreover, the first branch portion 1111BI includes the voltage monitoring wires 1111Bb1, 1111Bb2, 1111Bb3. The second branch portion 1111BJ includes the voltage monitoring wires 1111Bc1, 1111Bc2, 1111Bc3, 1111Bc4. The third branch portion 1111BK includes the temperature measurement wires 1111Bd.

The FPC 1111B is arranged such that the multiple voltage monitoring wires 1111Bb1, 1111Bb2, 1111Bb3, 1111Bc1, 1111Bc2, 1111Bc3, 1111Bc4 and the temperature measurement wires 1111Bd cross between a positive electrode 1211 and a negative electrode 1212 of each cell 1210. Moreover, each of tip ends of the multiple voltage monitoring wires 1111Bb1, 1111Bb2, 1111Bb3, 1111Bc1, 1111Bc2, 1111Bc3, 1111Bc4 is connected to a first connector 1115. Each of tip ends of the temperature measurement wires 1111Bd is connected to a second connector 1116.

On the FPC 1111B, a first arrangement region in which the multiple voltage monitoring wires 1111Bb1, 1111Bb2, 1111Bb3 are arranged and a second arrangement region in which the multiple voltage monitoring wires 1111Bc1, 1111Bc2, 1111Bc3, 1111Bc4 are arranged are each provided on one and the other sides with respect to an arrangement region of the multiple temperature measurement wires 1111Bd. On the trunk portion 1111BH, the first arrangement region is provided on the upper side in FIG. 18 with respect to the arrangement region of the multiple temperature measurement wires 1111Bd. Moreover, on the trunk portion 1111BH, the second arrangement region is provided on the lower side in FIG. 18 with respect to the arrangement region of the multiple temperature measurement wires 1111Bd.

On the trunk portion 1111BH, one of the multiple voltage monitoring wires 1111Bb1, 1111Bb2, 1111Bb3, which are arranged in the first arrangement region, closer to the arrangement region of the temperature measurement wires 1111Bd is connected to one of the cells 1210 arranged at a position farther from the first connector 1115. Similarly, on the trunk portion 1111BH, one of the multiple voltage monitoring wires 1111Bc1, 1111Bc2, 1111Bc3, 1111Bc4, which are arranged in the second arrangement region, closer to the arrangement region of the temperature measurement wires 1111Bd is connected to one of the cells 1210 arranged at a position farther from the first connector 1115. Thus, as in the case of the first embodiment, the potentials of the voltage monitoring wires satisfy a relationship of VBc4>VBb3>VBc3>VBb2>VBc2>VBb1>VBc1. Note that the potentials of the voltage monitoring wires 1111Bb1, 1111Bb2, 1111Bb3 are each VBb1, VBb2, and VBb3. Further, the potentials of the voltage monitoring wires 1111Bc1, 1111Bc2, 1111Bc3, 1111Bc4 are each VBc1, VBc2, VBc3, and VBc4.

On the FPC 1111B according to the third embodiment, a tip end of the first branch portion 1111BI and a tip end of the second branch portion 1111BJ are connected to the first connector 1115 in a state in which a tip end side of the first branch portion 1111BI is bent to a far side in the plane of paper with respect to a bending line which is a portion indicated by a chain line P1 in FIG. 18. Note that a tip end of the third branch portion 1111BK is connected to the second connector 1116.

As described above, in the third embodiment, at a location connected to the first connector 1115, the FPC 1111B is also used in a state in which part of the FPC 1111B is bent as follows. That is, part of the FPC 1111B is bent such that front and back surfaces of the FPC 1111B face each other and the multiple voltage monitoring wires 1111Bb1, 1111Bb2, 1111Bb3 provided in the first arrangement region and the multiple voltage monitoring wires 1111Bc1, 1111Bc2, 1111Bc3, 1111Bc4 provided in the second arrangement region are in parallel with each other.

Note that in the case of the third embodiment, terminals 1115B1, 1115B2, 1115B3 of the first connector 1115 are each electrically connected to the voltage monitoring wires 1111Bb1, 1111Bb2, 1111Bb3. Moreover, terminals 1115C1, 1115C2, 1115C3, 1115C4 of the first connector 1115 are each electrically connected to the voltage monitoring wires 1111Bc1, 1111Bc2, 1111Bc3, 1111Bc4.

As described above, the relationship of VBc4>VBb3>VBc3>VBb2>VBc2>VBb1>VBc1 is satisfied. Thus, as in the case of the first embodiment, the potentials of the terminals of the first connector 1115 satisfies a relationship of VC4>VB3>VC3>VB2>VC2>VB1>VC1.

On the FPC 1111B according to the third embodiment as configured above, advantageous effects similar to those in the case of the first embodiment can be provided. Note that in the case of the third embodiment, the voltage monitoring wires 1111Bb1, 1111Bb2, 1111Bb3, 1111Bc1, 1111Bc2, 1111Bc3, 1111Bc4 are provided on one surface side of the base film 1111a1. Further, the temperature measurement wires 1111Bd are provided on the opposite surface side of the base film 1111a1. Thus, a cost increases as compared to the case of the first embodiment. However, in the case of the third embodiment, there is an advantage that the degree of freedom in design can be enhanced, such as an increase in the wire density of the voltage monitoring wires 1111Bb1, 1111Bb2, 1111Bb3, 1111Bc1, 1111Bc2, 1111Bc3, 1111Bc4. Note that in the case of the third embodiment, the temperature measurement wires 1111Bd are provided on the back side of the base film 1111a1. Thus, terminal contact portions of the second connector 1116 connected to the temperature measurement wires 1111Bd are on a side opposite to that in the case of the first embodiment. Note that a through-hole is provided in the vicinity of the tip end of the third branch portion 1111BK so that conductive portions of the temperature measurement wires 1111Bd can be formed on the front side of the base film 1111a1. Thus, the second connector 1116 used in the first embodiment can be directly used.

(Variation of Battery)

Figure 20:
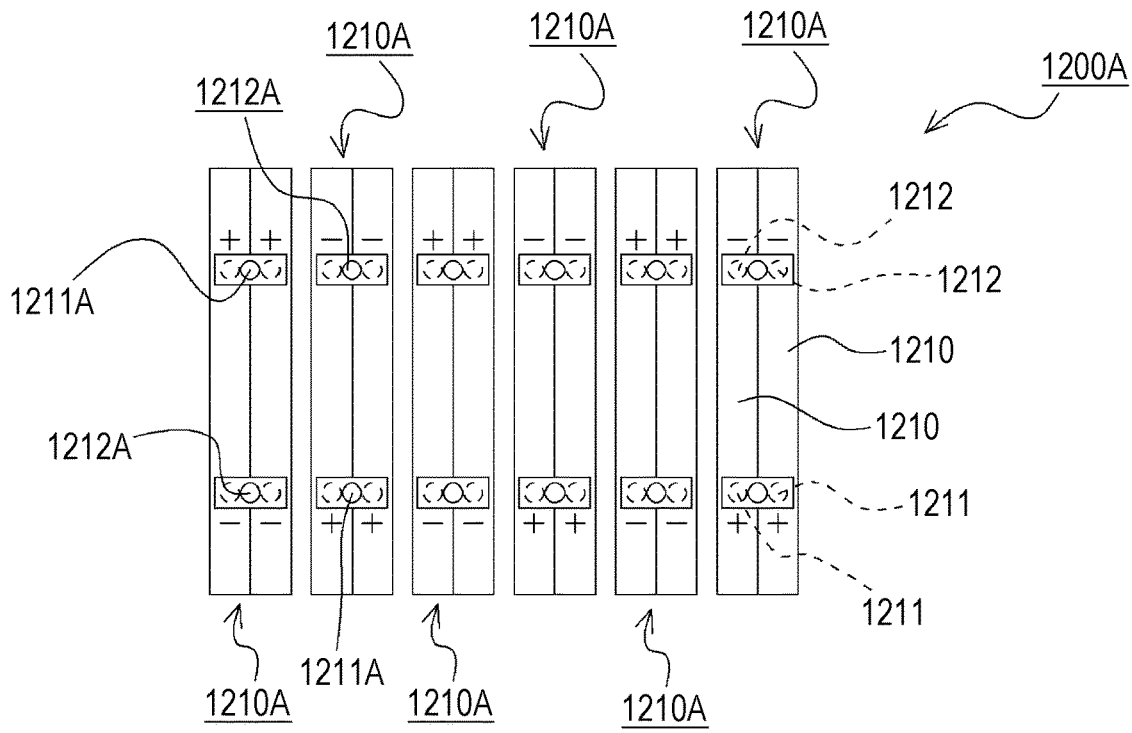
FIG. 20 is a plan view illustrating a variation of the battery.
Figure 21:
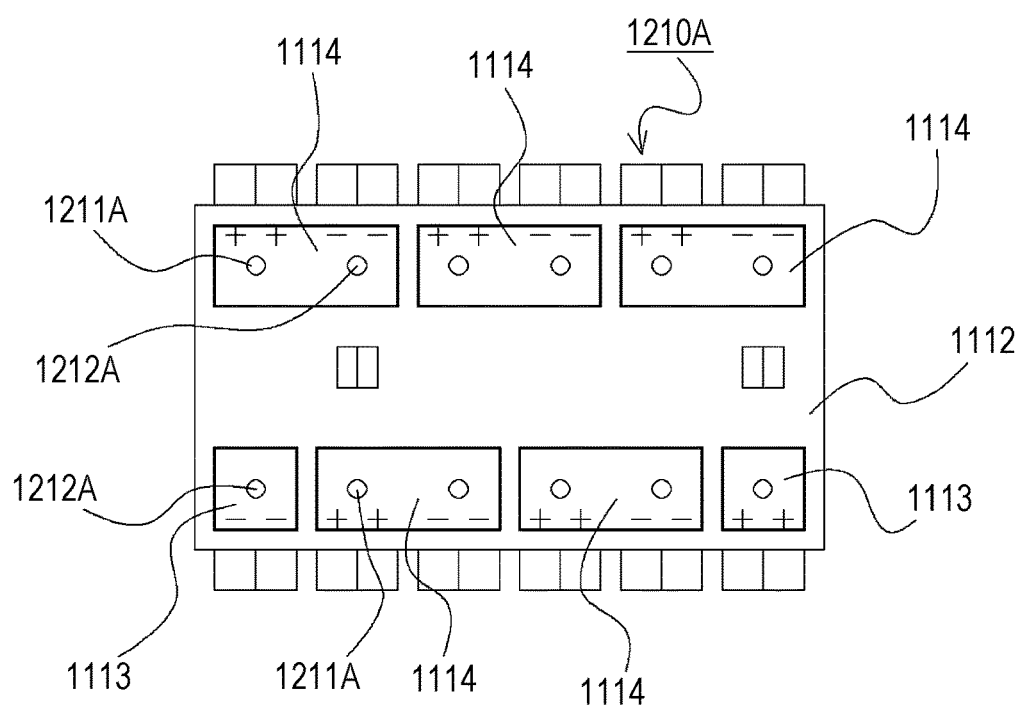
FIG. 21 is a plan view illustrating a state in which the battery module is attached to the battery according to the variation.

FIGS. 20 and 21 illustrate a variation of the battery to which each of the above-described battery modules is applicable. FIG. 20 is a plan view illustrating the variation of the battery. FIG. 21 is a plan view illustrating a state in which the battery module is attached to the battery according to the variation. Note that in FIG. 21, only the support member 1112 and the bus bars 1113, 1114 of the configuration of the battery module are illustrated for the sake of simplicity in illustration of the configuration.

A battery 1200A according to the present variation includes multiple cell units 1210A. The cell unit 1210A includes multiple cells 1210 connected in parallel with each other. The illustrated example shows a case where the cell unit 1210A includes two cells 1210 connected in parallel with each other. Note that the cell unit may include three or more cells 1210 connected in parallel with each other. The multiple cell units 1210A are arrayed such that a positive electrode 1211A and a negative electrode 1212A are adjacent to each other in adjacent ones of the cell units 1210A. Moreover, these multiple cell units 1210A are connected in series in such a manner that adjacent ones of the positive electrodes 1211A and the negative electrodes 1212A are electrically connected to each other through the bus bar 1114.

The FPC and the battery module including the FPC as described above in each embodiment are also applicable to the battery 1200A as configured above. That is, monitoring of the voltage of the battery 1200A and measurement of the temperature of the battery 1200A can be performed. For example, in the case of using the FPC 1111 according to the first embodiment, the FPC 1111 is arranged such that the multiple voltage monitoring wires 1111b1, 1111b2, 1111b3, 1111c1, 1111c2, 1111c3, 1111c4 and the temperature measurement wires 1111d cross between the positive electrode 1211A and the negative electrode 1212A of each cell unit 1210A.

(Other)

The method for bending the FPC is not limited to that of the example described in each embodiment. Specifically, the bending method varies according to the shape of the trunk portion. In other words, it may only be required that at the location connected to the connecter, the FPC is bent such that the front and back surfaces of the flexible printed circuit board face each other and the multiple voltage monitoring wires provided in the first arrangement region and the multiple voltage monitoring wires provided in the second arrangement region are in parallel with each other.

Moreover, in the above-described embodiments, the configuration in which each of the voltage monitoring apparatus body 1120 and the temperature measurement apparatus body 1130 is provided has been described. However, a configuration in which one apparatus performs voltage monitoring and temperature measurement may be employed. In this case, a configuration in which multiple voltage monitoring wires and multiple temperature measurement wires are connected to one connector may be employed. Note that for reducing degradation of the temperature measurement accuracy, a sufficient space is preferably provided between a region connected to the voltage monitoring wires and a region connected to the temperature measurement wires.

Further, in the above-described embodiments, it is configured such that the terminals of the connector are arranged in a matrix as illustrated in FIG. 15. However, it may only be required that in the connector, the multiple terminals connected to the voltage monitoring wires and the multiple terminals connected to the temperature measurement wires are in parallel with each other. That is, it may only be required that the multiple voltage monitoring wires provided in the first arrangement region and the multiple voltage monitoring wires provided in the second arrangement region are in parallel with each other. For example, in FIG. 15, the terminal 1115B1 and the terminal 1115C1 are arranged substantially straight along an upper-lower direction of the figure, the terminal 1115B2 and the terminal 1115C2 are arranged substantially straight along the upper-lower direction of the figure, and the terminal 1115B3 and the terminal 1115C3 are arranged substantially straight along the upper-lower direction of the figure. However, as viewed in the upper-lower direction, the terminal 1115B1 may be positioned between the terminal 1115C1 and the terminal 1115C2, the terminal 1115B2 may be positioned between the terminal 1115C2 and the terminal 1115C3, and the terminal 1115B3 may be positioned between the terminal 1115C3 and the terminal 1115C4.

In addition, in the configurations described above in the embodiments, the cells or the cell units are connected in series such that the potential of the cell or the cell unit increases as the cell or the cell unit is placed farther from the connector and decreases as the cell or the cell unit is placed closer to the connector. However, the cells or the cell units may be connected in series such that the potential of the cell or the cell unit decreases as the cell or the cell unit is placed farther from the connector and increases as the cell or the cell unit is placed closer to the connector. Needless to say, similar advantageous effects are also provided in this case.

The configuration in which the FPC is bent is employed as described above so that the wire arrangement in the vicinity of the connector can be changed.

Note that there is still room for improvement in the configuration according to each of the above-described embodiments. For example, in the configuration according to each embodiment, the shape of the FPC is complicated while the degree of freedom in changing the wire arrangement is not so high. Note that as in the case of the third embodiment, in a case where the configuration in which the wires are provided on both surface sides of the base film is employed, the degree of freedom in changing the wire arrangement can be enhanced as compared to the first and second embodiments. However, in the case of such a configuration, flexibility is degraded, and therefore, workability in attachment to the battery is degraded.

Figure 2:
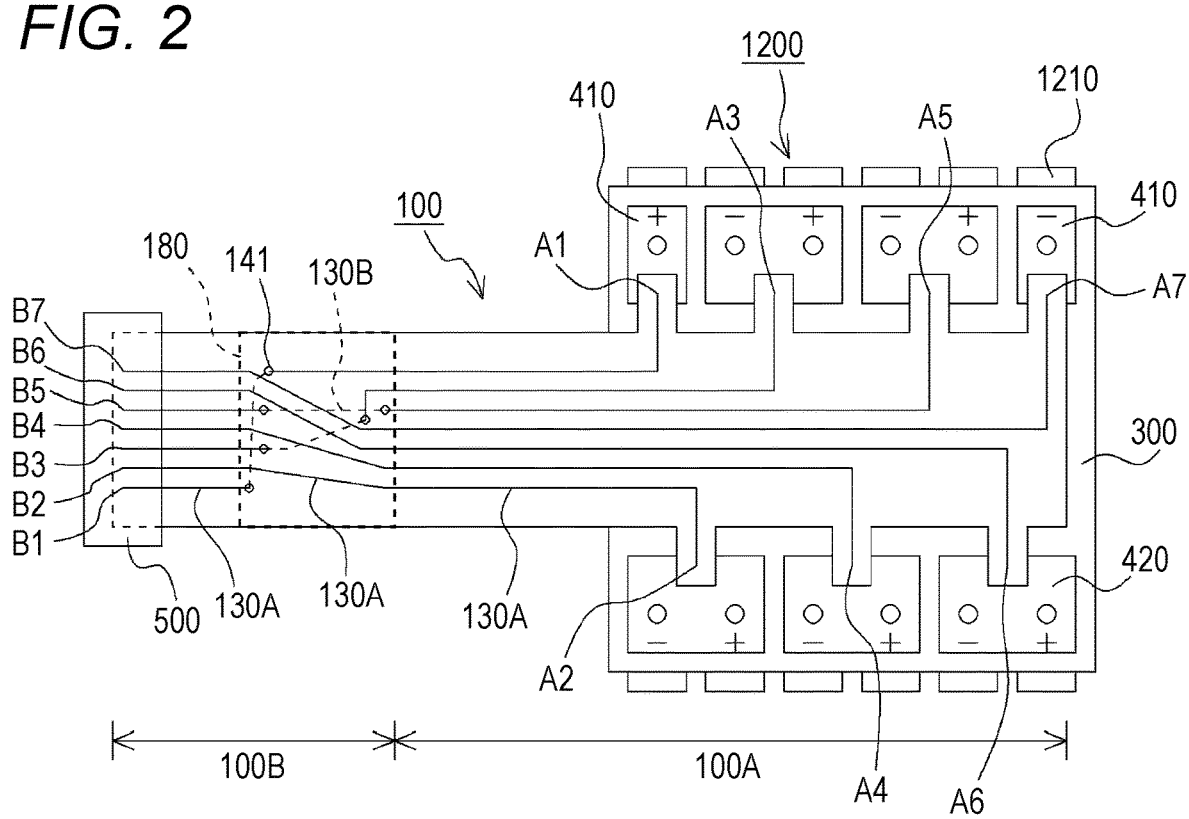
FIG. 2 is a plan view illustrating a state in which a battery module according to a first example of the present disclosure is attached to the battery.
Figure 3:
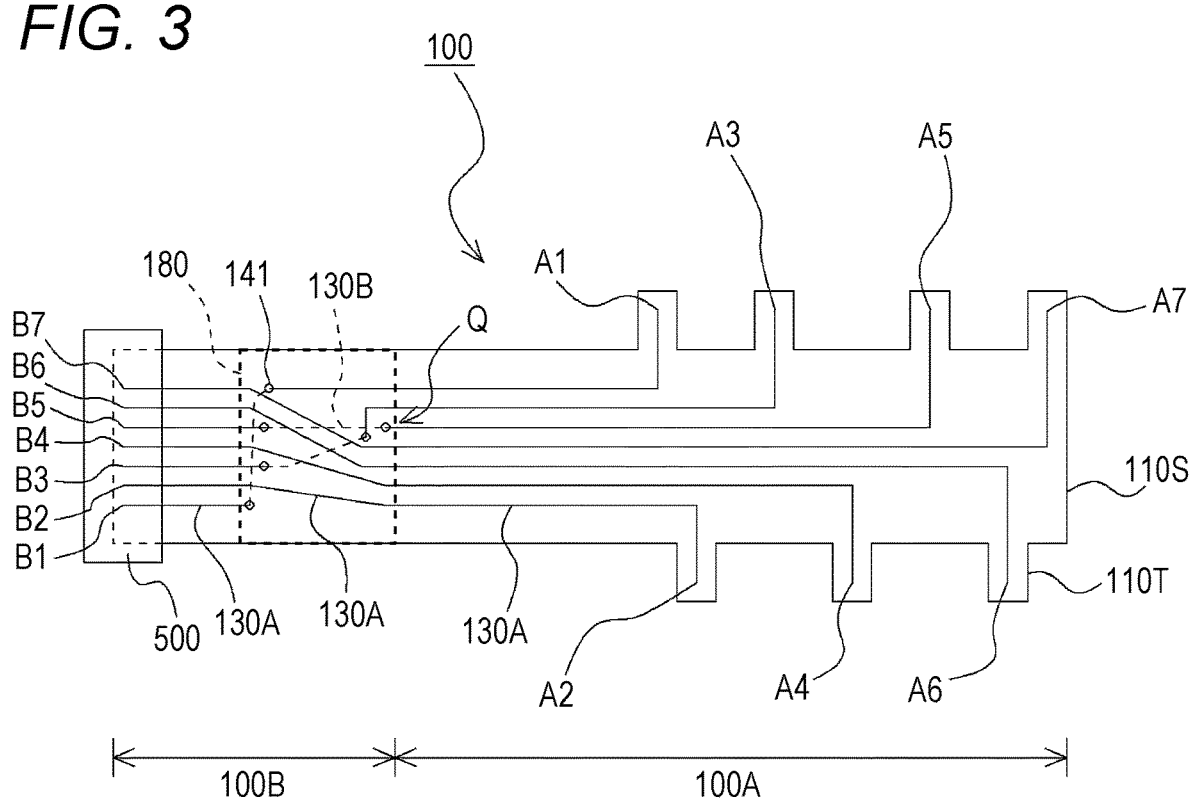
FIG. 3 is a plan view illustrating a state in which a flexible printed circuit board according to the first example of the present disclosure is attached to a connector.
Figure 4:
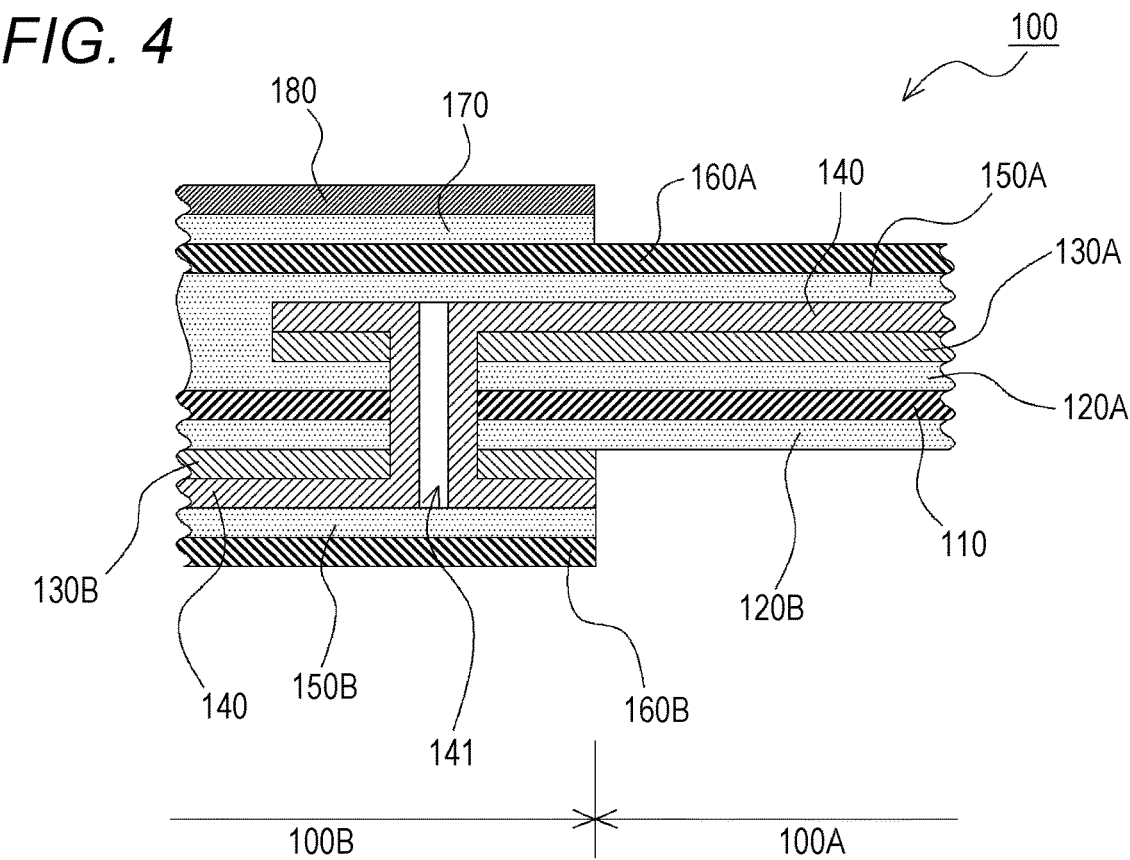
FIG. 4 is a schematic sectional view of the flexible printed circuit board according to the first example of the present disclosure.

Next, exemplary modes for carrying out the technique of the present disclosure will be described in detail with reference to the drawings based on examples. Note that unless otherwise specified, dimensions, materials, shapes, relative arrangement and the like of components described in these examples are not intended to limit the scope of the technique of the present disclosure only to these dimensions, materials, shapes, relative arrangement and the like First Example A flexible printed circuit board and a battery module according to a first example of the present disclosure will be described with reference to FIGS. 1 to 4. FIG. 1 is a plan view of a battery to which the battery module according to the present example is attached. FIG. 2 is a plan view illustrating a state in which the battery module according to the first example of the present disclosure is attached to the battery. FIG. 3 is a plan view illustrating a state in which the flexible printed circuit board according to the first example of the present disclosure is attached to a connector. FIG. 4 is a schematic sectional view of the flexible printed circuit board according to the first example of the present disclosure.

<Battery>

Specifically, the battery to which the flexible printed circuit board and the battery module according to the present example are attached will be described with reference to FIG. 1. A battery 1200 includes multiple arrayed cells 1210. These multiple cells 1210 are arrayed such that a positive electrode 1211 and a negative electrode 1212 are adjacent to each other in adjacent ones of the cells 1210. Moreover, these multiple cells 1210 are connected in series in such a manner that adjacent ones of the positive electrodes 1211 and the negative electrodes 1212 are electrically connected to each other through a bus bar provided in the battery module. In the figure, P surrounded by a dashed line indicates a location connected to the bus bar. Note that in the illustrated example, the battery 1200 including six cells 1210 is illustrated for the sake of convenience in illustration. However, a battery mounted on, e.g., an electric vehicle generally includes more cells.

<Battery Module>

Specifically, an entire configuration of the battery module according to the present example will be described with reference to FIG. 2. The battery module includes the flexible printed circuit board (hereinafter referred to as an "FPC 100"), a support member 300 configured to support the FPC 100, multiple bus bars 410, 420 supported on the support member 300, and a connector 500 fixed at an end portion of the FPC 100.

The bus bars in the present example are each electrically connected to multiple wires provided on the FPC 100, and are each electrically connected to electrodes provided on the multiple cells 1210. The bus bars 410 are each connected to the positive electrode 1211 and the negative electrode 1212 at both end cells 1210 of the cells 1210 connected in series. Moreover, the bus bar 420 is used for electrically connecting the positive electrode 1211 the negative electrode 1212 adjacent to each other. The connector 500 is, for example, connected to a not-shown voltage monitoring apparatus body.

<Flexible Printed Circuit Board (FPC)>

The FPC 100 according to the present example will be described in more detail with reference to FIGS. 2 to 4. Generally, the types of FPC include a one-sided structure type that a circuit is provided only on one side and a double-sided structure type that circuits are formed on both sides. The FPC 100 according to the present example includes a one-sided structure portion and a double-sided structure portion. In FIGS. 2 and 3, an area 100A of the FPC 100 is a one-sided structure portion area, and an area 100B of the FPC 100 is a double-sided structure portion area. Hereinafter, the one-sided structure portion of the FPC 100 will be referred to as a "one-sided structure portion 100A," and the double-sided structure portion of the FPC 100 will be referred to as a "double-sided structure portion 100B."

The FPC 100 has a multilayer structure of multiple layers including a film with flexibility and conductor portions to be wires. This point will be described with reference to FIG. 4. FIG. 4 schematically illustrates part of a section obtained by cutting the vicinity of a portion indicated by an arrow Q in FIG. 3 in parallel with a longitudinal direction of the FPC 100.

The FPC 100 includes a base film 110 and the conductor portions (forming wires 130A, 130B) each provided on both surfaces of the base film 110. An adhesive layer 120A, 120B for bonding the base film 110 and the conductor portion is provided between the base film 110 and each conductor portion. Moreover, a portion of the FPC 100 illustrated in FIG. 4 is provided with a through-hole 141 as a conductive portion for electrically connecting the wire 130A and the wire 130B. The wire 130A and the wire 130B are electrically connected by a through-hole plating portion 140. The conductor portions forming the wires 130A, 130B and the through-hole plating portion 140 are covered with cover films 160A, 160B bonded with adhesive layers 150A, 150B. Note that the conductor portion is formed from, e.g., copper foil. Moreover, the base film 110 and the cover films 160A, 160B are made of polyimide resin (PI) or polyethylene naphthalate resin (PEN).

At the one-sided structure portion 100A as described herein, the conductor portion forming the wires 130A, the cover film 160A and the like are provided. However, at the one-sided structure portion 100A, the conductor portion forming the wires 130B, the cover film 160B and the like are not provided. That is, at the one-sided structure portion 100A, the conductor portion to be the multiple wires 130A is provided only on one surface of the base film 110. The one-sided structure portion 100A is, for example, formed as follows. That is, the base film 110 as a base material on both surfaces of which the conductor portions are provided is prepared in advance. A predetermined region of the conductor portion on the other surface side of the base film 110 is removed by etching. In this manner, the one-sided structure portion 100A can be provided on the base film 110. Part of the one-sided structure portion 100A configured as described above is attached to the battery 1200 (see FIG. 2).

On the other hand, the double-sided structure portion 100B is provided at at least part of a region apart from the region attached to the battery 1200. At the double-sided structure portion 100B, the conductor portions to be the multiple wires 130A, 130B are provided on both surfaces of the base film 110. Further, at the double-sided structure portion 100B, the multiple through-holes 141 electrically connecting the wires 130A on one surface side of the base film 110 and the wires 130B on the other surface side of the base film 110 are arranged.

When the FPC 100 is bent at a location at which the through-holes 141 are provided, there is a probability that a conductive function is degraded due to, e.g., cracking of the through-hole plating portion 140 at the through-hole 141. For this reason, a reinforcing plate is preferably attached to a region in which the multiple through-holes 141 are arranged. In FIGS. 2 and 3, a reinforcing plate 180 to be attached is indicated by a dashed line. In the case of attaching the reinforcing plate 180, the reinforcing plate 180 may be bonded to a front surface of the cover film 160A with an adhesive layer 170 as illustrated in FIG. 4.

<Wire Arrangement>

The method for arranging the wires on the FPC 100 will be described with reference to FIGS. 2 and 3. As described above, the conductor portions forming the wires 130A, 130B are covered with the cover films 160A, 160B. Note that in FIGS. 2 and 3, for the sake of convenience in illustration, the wires 130A on one surface side of the base film 110 are indicated by solid lines and the wires 130B on the other surface side are indicated by dashed lines.

In the present example, seven wires 130A are provided on one surface side of the base film 110. Each of three of these wires is divided, and these divided wires are, as one wire, electrically connected to three wires 130B provided on the other surface side of the base film 110. Moreover, these three wires 130A cross, without short circuit, the other wires 130A on one surface side by the wires 130B provided on the other surface side of the base film 110. As described above, wire arrangement is changed.

Each of one end portions A1, A2, A3, A4, A5, A6, A7 of these seven wires 130A is attached to a corresponding one of bus bars 410, 420. On the other hand, the other end portions B1, B2, B3, B4, B5, B6, B7 of seven wires 130A are attached to the connector 500 (more specifically, terminals (not shown) of the connector 500). The potentials of one end portion An and the other end portion Bn are Vn, such as the potentials V1 of one end portion A1 and the other end portion B1 and the potential V2 of one end portion A2 and the other end portion B2. In this case, $V1>V2>V3>V4>V5>V6>V7$ is satisfied. This is because the multiple cells 1210 are connected in series as described above.

It is configured such that the connector-500-side other end portions B1, B2, B3, B4, B5, B6, B7 of seven wires 130A are arranged in this order by a change in the wire arrangement as described above. Moreover, $V1>V2>V3>V4>V5>V6>V7$ is satisfied as described above. Thus, at the position of the connector 500, a potential difference between the end portions of adjacent ones of the wires 130A (between the terminals of the connector) can be minimized Consequently, short circuit due to migration can be reduced.

<Merits of Flexible Printed Circuit Board and Battery Module according to Present Example>

On the FPC 100 according to the present example, the configuration in which the conductor portion to be the multiple wires 130A is provided only on one surface of the base film 110 in the region attached to the battery 1200 is employed. That is, the region of the FPC 100 attached to the battery 1200 is configured as the one-sided structure portion 100A. Thus, the region of the FPC 100 attached to the battery 1200 has high flexibility. Consequently, the FPC 100 has excellent attachment workability.

Moreover, the following configuration is employed on the FPC 100. In this configuration, the conductor portions to be the multiple wires 130A, 130B are provided on both surfaces of the base film 110 at at least part of the region apart from the region attached to the battery 1200, and the multiple through-holes 141 electrically connecting the wires 130A on one surface side of the base film 110 and the wires 130B on the other surface side of the base film 110 are arranged. That is, at least part of the region apart from the region attached to the battery 1200 forms the double-sided structure portion 100B. At the double-sided structure portion 100B, the wire arrangement can be changed.

On the FPC 100, the configuration in which the reinforcing plate 180 is attached to the region in which the multiple through-holes 141 are arranged can be employed. In this case, bending of the FPC 100 at a portion corresponding to the through-holes 141 is reduced. Thus, degradation of the conductive function can be reduced.

Second Example

Figure 5:
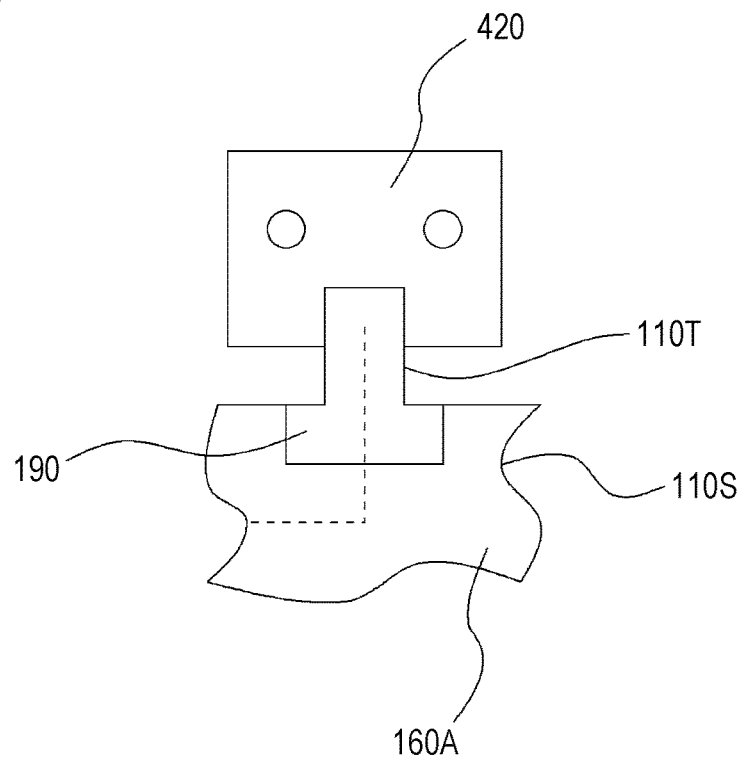
FIG. 5 is a plan view of part of a flexible printed circuit board according to a second example of the present disclosure.

FIG. 5 illustrates a second example of the present disclosure. In the present example, a configuration in a case where a reinforcing film is provided at part of an FPC will be described. Other configurations and features are the same as those of the first example. Thus, the same reference numerals are used to represent the same components, and description thereof will be omitted.

FIG. 5 illustrates a plan view of part of the FPC according to the second example of the present disclosure. The FPC according to the present example is configured such that a reinforcing film 190 is further added to the configuration of the FPC 100 according to the first example. That is, at a one-sided structure portion 100A of the FPC according to the present example, multiple branch portions 110T are provided on a base film 110 (also see FIG. 3). Each branch portion 110T is provided for arranging a wire 130A from a trunk portion 1105 on which the multiple wires 130A are arranged toward each cell.

These branch portions 110T have narrow widths and low strengths. Thus, in the present example, the reinforcing film 190 is provided on each of the multiple branch portions 110T. The reinforcing film 190 is, for example, bonded to a surface of a cover film 160A through an adhesive layer. With this configuration, the strength of a portion corresponding to the branch portion 110T can be enhanced. Thus, disconnection of the wire 130A provided on the branch portion 110T when the FPC is attached to a battery 1200 can be reduced. Note that the FPC according to the present example is different from the FPC 100 described in the first example only in that the reinforcing films 190 are provided.

Third Example

Figure 6A:
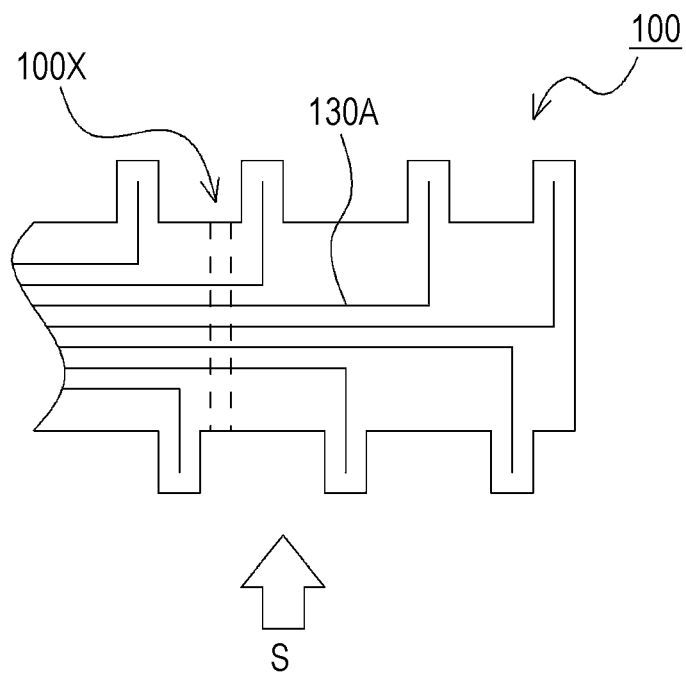
FIGS. 6A and 6B are schematic configuration views of a flexible printed circuit board according to a third example of the present disclosure.
Figure 6B:

FIGS. 6A and 6B illustrate a third example of the present disclosure. In the present example, a configuration in a case where a bending portion allowing expansion and contraction of an FPC in a longitudinal direction thereof is provided at the FPC will be described. Other configurations and features are the same as those of the first example. Thus, the same reference numerals are used to represent the same components, and therefore, description thereof will be omitted.

FIGS. 6A and 6B are schematic configuration views of the FPC according to the third example of the present disclosure. FIG. 6A illustrates a plan view of part of the FPC according to the present example. FIG. 6B illustrates a side view of part of the FPC according to the present example (a view from the direction of an arrow S in FIG. 6A).

As illustrated in the figure, a bending portion 100X is provided to protrude to one surface side at part of a one-sided structure portion 100A at an FPC 100 according to the present example. With such a bending portion 100X, the FPC 100 can expand and contract in a longitudinal direction thereof. Thus, workability in attachment of the FPC 100 to a battery 1200 can be further enhanced. In the illustrated configuration example, the bending portion 100X is provided only at one location. On this point, bending portions may be provided at two or more locations of the one-sided structure portion 100A.

Note that the FPC 100 according to the present example is different from the FPC 100 described in the first example in that the bending portion 100X is provided. Moreover, in the present example, a configuration in which a reinforcing film 190 is provided on a branch portion 110T as described in the second example can be also employed.

Fourth Example

Figure 7:
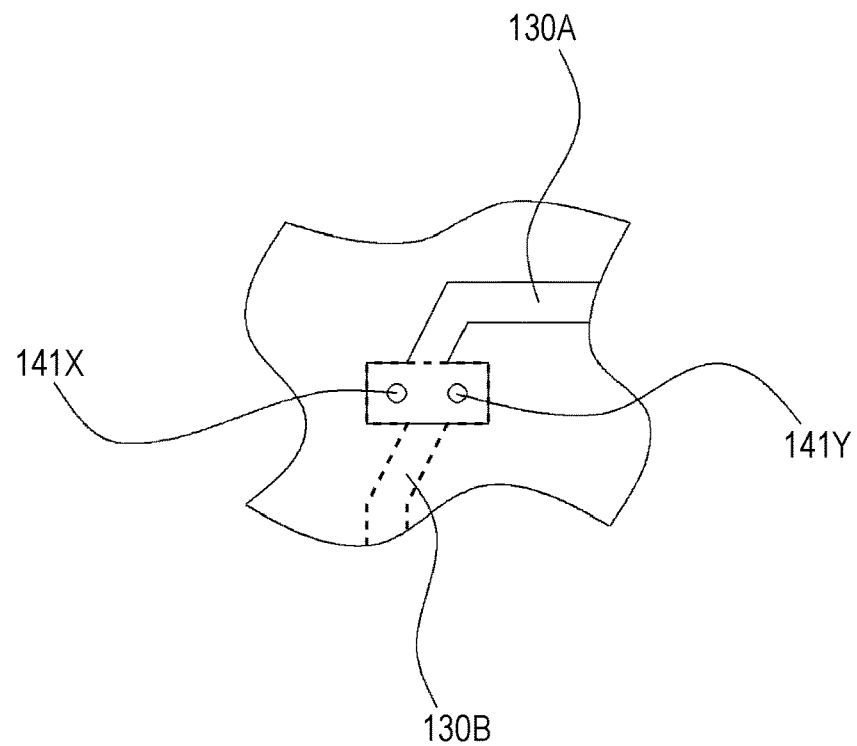
FIG. 7 is a plan view of part of a flexible printed circuit board according to a fourth example of the present disclosure.
Figure 8:
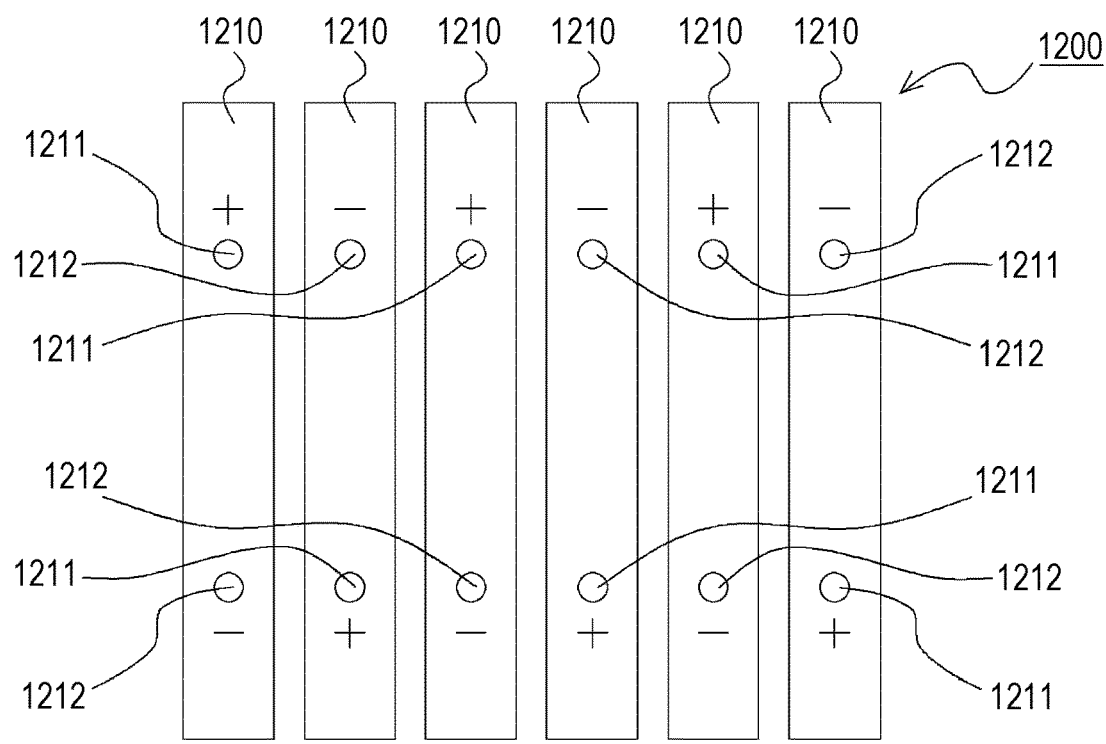
FIG. 8 is a plan view of a battery.
Figure 9:
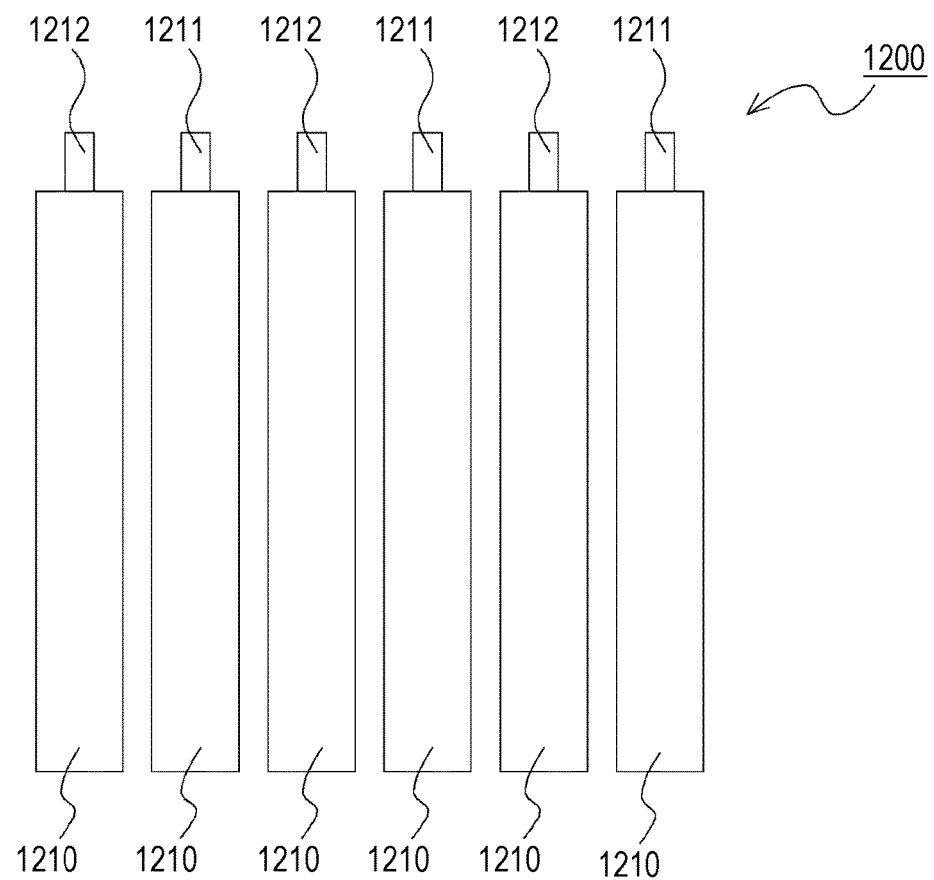
FIG. 9 is a side view of the battery.
Figure 10:
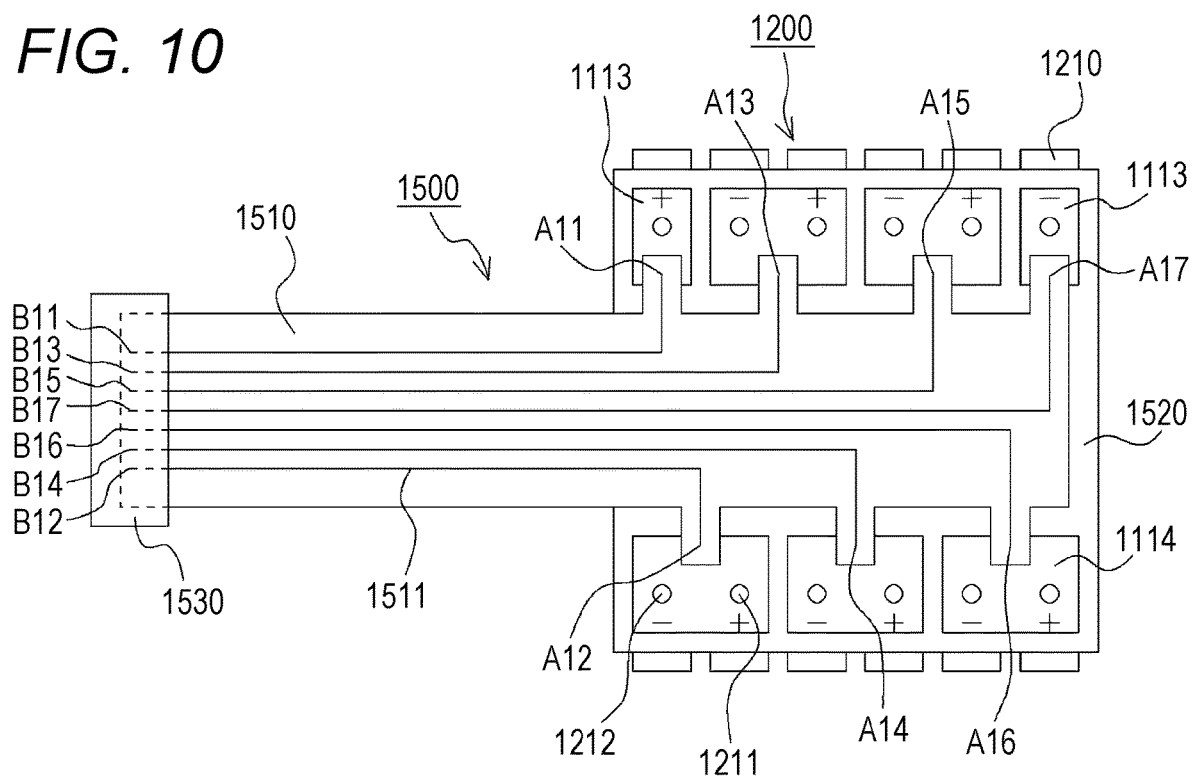
FIG. 10 is a plan view illustrating a state in which a battery module according to a typical example is attached to the battery.

FIG. 7 illustrates a fourth example of the present disclosure. In the present example, a configuration relating to a conductive portion (a through-hole) is designed. Other configurations and features are the same as those of the first example. Thus, the same reference numerals are used to represent the same components, and description thereof will be omitted.

FIG. 7 illustrates a plan view of part of an FPC according to the fourth example of the present disclosure. In the present example, multiple conductive portions electrically connecting wires 130A on one surface side of a base film 110 and wires 130B on the other surface side of the base film 110 are provided such that the wires are electrically connected to each other at multiple locations in one-to-one correspondence, i.e., one wire 130A and one wire 130B are electrically connected to each other at multiple locations. More specifically, one wire 130A and one wire 130B are electrically connected to each other by through-holes 141X, 141Y as conductive portions at two locations.

With this configuration, even in a case where a conductive function of one through-hole is degraded due to some kinds of influence, the other through-hole provides the conductive function. Thus, non-energization between the wire 130A and the wire 130B can be reduced. In the illustrated example, the case where the conductive portions (the through-holes) are provided at two locations is described. On this point, the conductive portions may be provided at three or more locations. The configuration described in the present example is also applicable to any of the first to third examples.

The flexible printed circuit board of the present disclosure may be the following first flexible printed circuit board.

The first flexible printed circuit board is a flexible printed circuit board attached to a battery configured such that multiple cells are arrayed, the flexible printed circuit board including a base film and multiple wires formed on the base film. In a region attached to the battery, a conductor portion to be the multiple wires is provided only on one surface of the base film. At at least part of a region apart from the region attached to the battery, a conductor portion to be the multiple wires is provided on each surface of the base film. Multiple conductive portions configured to electrically connect the wires on one surface side of the base film and the wires on the other surface side of the base film are arranged.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A flexible printed circuit board comprising:
a base film including a first surface and a second surface opposite to the first surface; and
multiple wires formed on the base film, the multiple wires including a first set of wires formed on the first surface and a second set of wires formed on the second surface;
wherein, among the first set of wires and the second set of wires, only the first set of wires is provided in each portion of the flexible printed circuit board configured to be attached to a battery including multiple arrayed cells,
at at least part of a first region apart from a second region, the second region including each portion of the flexible printed circuit board configured to be attached to the battery, both the first set of wires and the second set of wires are provided, and
the flexible printed circuit board further includes at least one conductive via, each one of the at least one conductive via being configured to electrically connect one of the first set of wires to one of the second set of wires.

2. The flexible printed circuit board according to claim 1, wherein
the at least one conductive via is formed as at least one through-hole, and a reinforcing plate is attached to a third region in which the at least one through-hole is arranged.

3. The flexible printed circuit board according to claim 1, wherein
on the base film, multiple branch portions for arranging the multiple wires toward each cell extend from a trunk portion on which the multiple wires are arranged, and
a reinforcing film is provided on each of the multiple branch portions.

4. The flexible printed circuit board according to claim 1, wherein a bending portion allowing expansion and contraction in a longitudinal direction is provided.

5. The flexible printed circuit board according to claim 1, wherein
the flexible printed circuit board includes a plurality of conductive vias, each one of the plurality of conductive vias being configured to electrically connect one of the first set of wires to one of the second set of wires such that the wires among the first set of wires and the second set of wires that are electrically connected are:
electrically connected to each other in one-to-one correspondence and
electrically connected to each other at multiple locations.

6. The flexible printed circuit board according to claim 1, wherein
each of the second set of wires crosses past at least one of the first set of wires so as to change an order of the multiple wires in a plan view.

7. The flexible printed circuit board according to claim 1, wherein the at least one conductive via is formed as at least one through-hole.

8. The flexible printed circuit board according to claim 7, wherein the at least one conductive via is provided at a third region included within the first region.

9. The flexible printed circuit board according to claim 8, wherein, among the first set of wires and the second set of wires, only the first set of wires is provided at a terminating end of the flexible printed circuit board opposite to each portion of the flexible printed circuit board configured to be attached to the battery.

10. A battery module comprising:
a flexible printed circuit board attached to a battery including multiple arrayed cells;
multiple bus bars each electrically connected to multiple wires provided on the flexible printed circuit board and each electrically connected to electrodes provided on the multiple cells; and
a connector fixed at an end portion of the flexible printed circuit board,
wherein the flexible printed circuit board includes
a base film including a first surface and a second surface opposite to the first surface, and
the multiple wires formed on the base film, the multiple wires including a first set of wires formed on the first surface and a second set of wires formed on the second surface,
among the first set of wires and the second set of wires, only the first set of wires is provided in each portion of the flexible printed circuit board attached to the battery,
at at least part of a first region apart from a second region, the second region including each portion of the flexible printed circuit board attached to the battery, both the first set of wires and the second set of wires are provided, and
at least one conductive via, each one of the at least one conductive via being configured to electrically connect one of the first set of wires to one of the second set of wires.

11. The battery module according to claim 10, wherein
the at least one conductive via is formed as at least one through-hole, and
a reinforcing plate is attached to a third region of the flexible printed circuit board, the at least one through-hole being arranged in the third region.

12. The battery module according to claim 10, wherein
on the base film, multiple branch portions for arranging the multiple wires toward each cell extend from a trunk portion on which the multiple wires are arranged, and
a reinforcing film is provided on each of the multiple branch portions.

13. The battery module according to claim 10, wherein
a bending portion allowing expansion and contraction in a longitudinal direction of the flexible printed circuit board is provided on the flexible printed circuit board.

14. The battery module according to claim 10, wherein
the flexible printed circuit board includes a plurality of conductive vias, each one of the plurality of conductive vias being configured to electrically connect one of the first set of wires to one of the second set of wires such that the wires among the first set of wires and the second set of wires that are electrically connected are:
electrically connected to each other in one-to-one correspondence and
electrically connected to each other at multiple locations.

15. The battery module according to claim 10, wherein
each of the second set of wires crosses past at least one of the first set of wires so as to change an order of the multiple wires in a plan view.

16. The battery module according to claim 10, wherein the at least one conductive via is formed as at least one through-hole.

17. The battery module according to claim 16, wherein the at least one conductive via is provided in the flexible printed circuit board at a third region included within the first region.

18. The battery module according to claim 17, wherein, among the first set of wires and the second set of wires, only the first set of wires is connected to the connector.

* * * * *